United States Patent
Demas et al.

(10) Patent No.: US 9,380,337 B2
(45) Date of Patent: Jun. 28, 2016

(54) COMMAND PACKETS FOR PERSONAL VIDEO RECORDER

(75) Inventors: Jason Demas, Irvine, CA (US); Sandeep Bhatia, Bangalore (IN); Marcus Kellerman, Aliso Viejo, CA (US); Girish R. Hulmani, Bangalore (IN); Srinivasa Mogathala Prabhakara Reddy, Bangalore (IN); Arun Gopalakrishna Rao, Mysore (IN); Xuemin Chen, San Diego, CA (US); Frederick George Walls, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 843 days.

(21) Appl. No.: 12/890,427

(22) Filed: Sep. 24, 2010

(65) Prior Publication Data

US 2011/0013887 A1  Jan. 20, 2011

Related U.S. Application Data

(63) Continuation of application No. 09/951,693, filed on Sep. 12, 2001, now abandoned.

(51) Int. Cl.
| | |
|---|---|
| *H04N 7/173* | (2011.01) |
| *H04N 21/4385* | (2011.01) |
| *G06T 9/00* | (2006.01) |
| *H04N 21/4147* | (2011.01) |
| *H04N 21/434* | (2011.01) |
| *H04N 21/6587* | (2011.01) |
| *H04N 21/845* | (2011.01) |

(52) U.S. Cl.
CPC ............ *H04N 21/4385* (2013.01); *G06T 9/004* (2013.01); *H04N 21/4147* (2013.01); *H04N 21/4348* (2013.01); *H04N 21/6587* (2013.01); *H04N 21/8455* (2013.01)

(58) Field of Classification Search
CPC .......... H04N 21/4385; H04N 21/4147; H04N 21/4348; H04N 21/6587; H04N 21/8455; G06T 9/004
See application file for complete search history.

(56) References Cited

U.S. PATENT DOCUMENTS

| | | | | |
|---|---|---|---|---|
| 5,805,762 | A * | 9/1998 | Boyce et al. | 386/314 |
| 6,334,026 | B1 * | 12/2001 | Xue et al. | 386/337 |
| 6,363,212 | B1 * | 3/2002 | Fujinami et al. | 386/338 |

FOREIGN PATENT DOCUMENTS

WO  9955090 A1  10/1999

OTHER PUBLICATIONS

Dutta S et al: "Smart Video Streams: 101 Uses of the User Data Field in MPEG" IEEE1995 Conference Record of the Twenty-Ninth Asilomar Conference on Signals, Systems and Computers; Oct. 30, 1995; pp. 1462-1466; vol. 2.
Communication pursuant to Article 94(3) EPC dated Feb. 18, 2010; EP Application No. 02798101.8.

* cited by examiner

*Primary Examiner* — Oschta Montoya
(74) *Attorney, Agent, or Firm* — Garlick & Markison; Shayne X. Short

(57) ABSTRACT

Command packets for a personal video recorder that provides for a transport stream (TS) that contains data and also includes a transport packet (TP)/TS formatted command packets. The TP/TS formatted command packet may be communicated between any number of devices, including multiple chips, multiple boards, and multiple processors. A decoder is able to decode the TP/TS formatted command packet and to perform the appropriate operation on data portions of the TS. When a TS is provided to a device not having the capability to perform the proper decoding of the TP/TS formatted command packet, that particular packet may be deemed as being unidentified (or unknown) adaptation field data. Alternatively, the packet may be identified as being corrupted data and/or irrelevant data.

20 Claims, 18 Drawing Sheets

COMMAND PACKETS FOR PERSONAL VIDEO RECORDER

CROSS REFERENCE TO RELATED PATENTS/PATENT APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 09/951,693, entitled "Command Packets for Personal Video Recorder,", filed Sep. 12, 2001, pending.

BACKGROUND

A. Technical Field

The invention relates generally to video recorder and playback systems; and, more particularly, it relates to command packets that may be inserted into a data transport stream.

B. Description of Related Art

Many previous systems that deal with digital video data, including the normal playback and trick play playback of that video data are intrinsically tied to the proprietary system and platform on which they are operating. There have also been many standards developed in this particular area of technology concerning data types. In addition, there have been several standards into which data is formatted for transport. One such transport standard is the motion picture expert group, MPEG-2 transport stream format (MPEG-2 TS). Many of the various data types are formatted into this MPEG-2 TS format for communication between various components in a system. The MPEG-2 TS will generically be referred to as MPEG TS in various remaining portions of this disclosure.

In addition, although there has been some uniformity in the development of TS formats, there has nevertheless been a dependence on dedicated communication and control between components that control the playback (including trick play playback) of the data and the device that performs the decoding of the data for playback. The control device and the decoding device may actually be in the same device, but there is nevertheless a great deal of dedicated interfacing that is required to perform the proper control of the data playback.

FIG. 1 shows a prior art conventional personal video recorder system 100. A host processor 110 is operable to control and/or provide data in a MPEG TS 115. The host processor provides and/or controls this data to a proprietary/conventional decoder 120. Again, the host processor 110 and the proprietary/conventional decoder 120 may also be included within a single device. The proprietary/conventional decoder 120 includes a host processor-specific dedicated, local intelligence 122 for decoding of trick play functions of the MPEG TS 115. Any other devices may also be used, besides a host processor 110, to control the decoding of the MPEG TS 115 and also to control any desired trick play functionality to be performed on the MPEG TS 115. To enable proper communication between the host processor 110 and the proprietary/conventional decoder 120, a great deal of interfacing is typically needed. In this situation, a dedicated communication/control interface 130 is required between the host processor 110 and the proprietary/conventional decoder 120. The host processor-specific dedicated, local intelligence 122 is operable to perform extraction of the commands, that may include some trick play functionality, and to perform modification of the MPEG TS 115. The proprietary/conventional decoder 120 is operable to perform MPEG data manipulation 124 that is required to enable trick play operations. The MPEG data manipulation modifies input MPEG data 125 and transforms it into modified MPEG data 126. This transformation is typically entirely proprietary and specific to the particular device used to perform this functionality.

Prior art systems are inoperable to perform direct trick play playback of MPEG data without performing proprietary modification of the input MPEG data 125 to transform it into the modified MPEG data 126 that includes the proper commands and controls to perform trick play playback of the input MPEG data 125. The modified MPEG data 126, within the proprietary system, is a data form that does not fall within the MPEG standard any longer. The data has been modified, as uniquely required, within the proprietary system to enable playback of the data in the proper manner. Other proprietary systems also perform similar modification of the data, as required within their respective systems. Typically, no two proprietary systems perform this modification of the data to enable playback in a similar manner.

This great deal of dedicated communication/control interfacing 130 is required to enable trick play operation, given that there the manipulation of the received MPEG TS 115, in transforming the input MPEG data 125 into the modified MPEG data 126, must be performed to enable trick play operations. Again, this inherently requires a great deal of interfacing, by communicating a great deal of command and control information, between the host processor 110 and the proprietary/conventional decoder 120. This great deal of interfacing between the devices requires a very large dedication of real estate in previous systems. Even in situations where the host processor 110 and the proprietary/conventional decoder 120 are contained within a single device, there must nevertheless be a great deal of interfacing between those two devices in the single device, again requiring a great deal of interfacing and also consuming much real estate in the single device system; the two components (even within a single device), one for command and control and one for decoding, must nevertheless be included within a single device. The output from the proprietary/conventional decoder 120 provides the now-modified MPEG data 126 to a display 140.

In the conventional situation, the data processing and data transfer requirements for MPEG data manipulation and modification, within the conventional personal video recorder system 100, requires a great deal of communication and processing requirements. From certain perspectives, conventional personal video recorder systems, that are capable to do trick play playback, inherently require dedicated communication and control within the self-contained system. This communication and control must all be tailored to the specific, proprietary system in which the data is to be played using trick play functionality.

Further limitations and disadvantages of conventional and traditional systems will become apparent to one of skill in the art through comparison of such systems with the invention as set forth in the remainder of the present application with reference to the drawings.

SUMMARY OF THE INVENTION

The present invention is directed to apparatus and methods of operation that are further described in the following Brief Description of the Several Views of the Drawings, the Detailed Description of the Drawings, and the claims. Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE DRAWINGS

Figure 1:
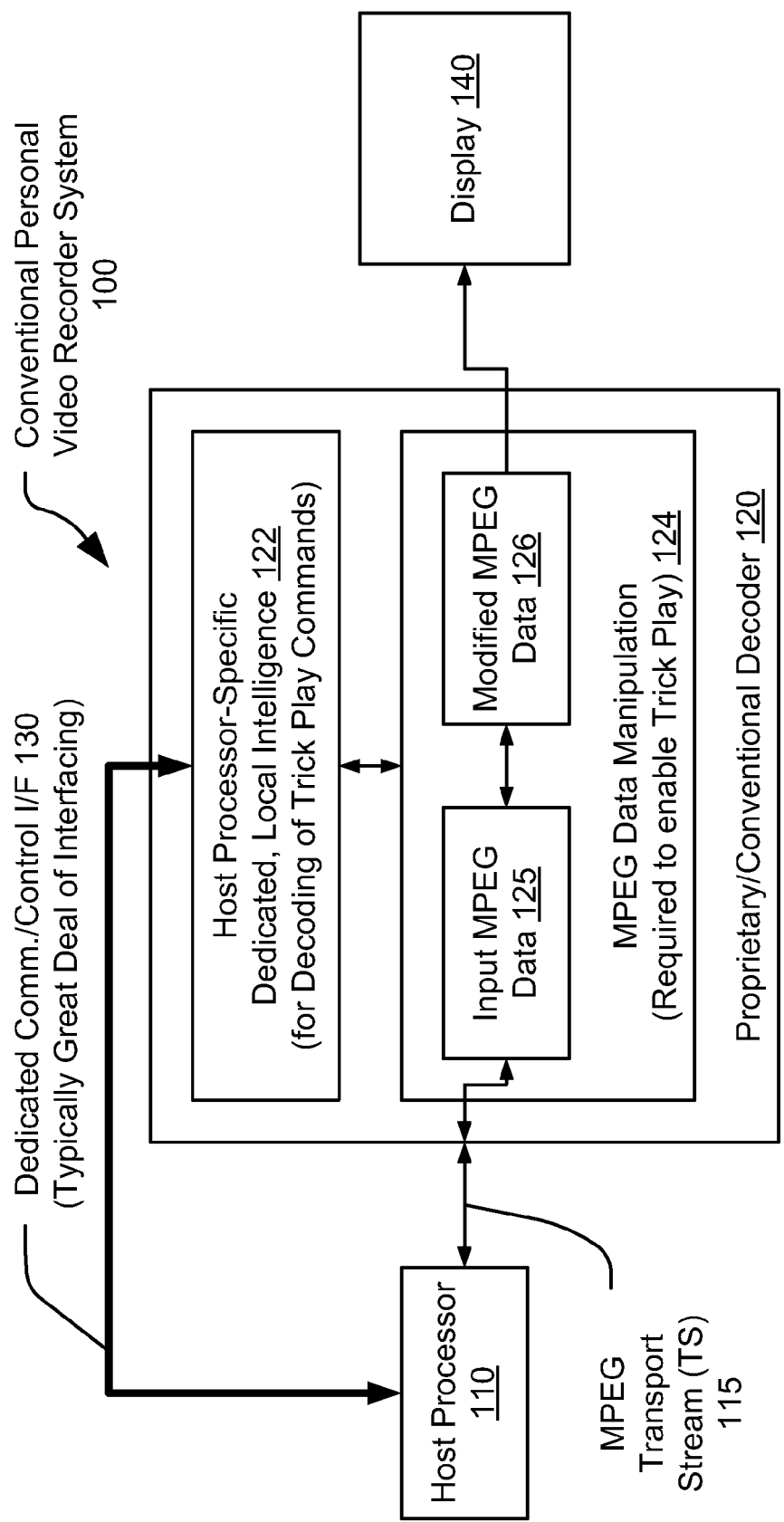
FIG. 1 is a system diagram illustrating an embodiment of a prior art conventional personal video recorder system.

Implementation of command packets within the transport stream allows the elimination of the great deal of interfacing required between a control device and a decoding and/or display device that is required in previous systems. The command packet includes one or more commands that are to be performed on data packets within the transport stream. The command packets may be inserted at any place within a system up to and before an output device that plays back the data packets of the transport stream. The commands within a command packet may be input by a user, it may be initiated by a detection of the type of content of transport stream, and any number of other inputs. The command packet includes the ability to perform trick play operations on the data packet portions within the transport stream.

In addition, a transport stream may include only command packets in certain embodiments; the command packets, formatted in transport stream format, are used to perform control operations between various devices. This particular embodiment provides the opportunity to perform control without a great deal of control-based interfacing by using the exiting communication lines that are operable to support the transport stream.

In certain embodiments, the transport stream is a motion picture expert group, such as a MPEG-2 transport stream. The command packets are formatted with headers having syntax that is compatible with the MPEG-2 transport stream format, so that the command packet may be transmitted along with the data packets within the transport stream without affecting the communication of the transport stream between any number of devices.

The transport stream is also operable within systems that do not have the decoding capability to extract the command information from a command packet contained within the transport stream. When a decoder tries to decode the MPEG formatted command packet, and when the decoder does not have the ability to decode and extract the command information from the command packet, that particular command packet is merely treated as being unidentified (or unknown) adaptation data within the transport stream. From other perspectives, this data may be viewed as being corrupted data; alternatively, the data is identified as being irrelevant data. Then, that packet (either identified as being irrelevant or corrupted data) is discarded and the remainder of the transport stream, having the data packets, is played back normally, just as data packets of an ordinary transport stream may be played back.

The present invention is able to insert command packets directly into a motion picture expert group, MPEG-2 transport stream (TS). For simplicity, MPEG-2 TS will commonly be referred to as MPEG TS using a convention commonly used by those persons having skill in the art. The command packets may be formatted in a similar way in which data is also formatted to comply with the MPEG TS format. The present invention is also operable, generically, to perform formatting of command packets into a TS format, so that they may be inserted within the TS, without affecting the ability of the TS to be received and decoded.

The location in which the command packet may be inserted into the TS may vary, as desired in the particular application. Certain embodiments of the present invention envision content management that may be performed by system up-stream from where the TS is generated. For example, a device may receive a TS, and based on analysis of the content of the TS, certain portions of the TS may be skipped, passed over, or otherwise handled differently based on the content of the data. For example, in some situations, content unsuitable for children may be detected and skipped over as desired by a user of certain aspects of the present invention. A parent could program their decoder to detect the data type in the TS and then to insert certain command packets into the TS so that the TS will be accommodated according to that parent's desires. If the parent wished to skip adult content completely, TS formatted command packets could be inserted to skip over adult-oriented content at all times. Conversely, other content based management could similarly be performed as will be understood by those persons having skill in the art.

For systems that are operable to decoded the TS formatted command packet, the control functionality of the command packet will readily be made available for use. The present invention obviates the need for the communication and control intensive interfacing between a control device and a decoding device that is prevalent in previous systems. Any number of commands may be included within a TS formatted command packet. The present invention obviates the need to implement trick play of data using proprietary techniques within previous systems. For example, rather than requiring the physical manipulation of the data into a form other than the ordinary form in which the data is received to enable trick play playback (as in previous systems), the present invention is operable to perform this functionality using the TS formatted command packets.

The TS formatted command packets are decoded in similar manner as the way an actual TS formatted data is decoded. For a regular MPEG-2 video bit stream, an EP picture usually is an Intra-coded picture (I-picture). The difference is that the system that performs the decoding uses the encoded command packets (extracted from within the TS formatted command packet) to perform the trick play functionality. The present invention is also backward compatible to systems that are not operable to perform trick play functionality. For example, when a TS formatted command packet is received, as part of the TS formatted data, the receiver of the trick play incapable system simply rejects, or discards, the TS formatted command packet as if it were corrupted data. Those persons having skill in the art will appreciate that the data may alternatively be identified as being irrelevant data, and not necessarily corrupted. The present invention is able to do this without deleteriously affecting the performance of normal and ordinary playback of the data. No substantial jitter is introduced by the detection and discarding of this data.

The present invention provides for a great decrease in the interfacing required between the device that provides the data, and may also provide control commands of how the data is to be played back, and the device that actually decodes the data and provides it to an output device. Within many of the various exemplary embodiments, the use of video data is used for illustration. Those persons having skill in the art will recognize that any form of digital data may be included in various embodiments. Audio data, video data, and other digital data may be handled using various aspects of the present invention to format command packets into a format compatible with the manner in which actual data is formatted for transport. The transport of data, and TS formatted command packets, may be between two embedded components within a single device, between multiple devices, and generically between any two elements that data may be transported. The command packets may be inserted into the TS at virtually any point without corrupting the TS. From an overview perspective, the command packets appear similar to an ordinary data packet in form. However, when that packet is decoded, it will contain command information that may include how other packets within the TS are to be handled. For a decoding system that is incapable to recognize or perform the proper functionality, the command packet will simply appear to be corrupted data. Again, those persons having skill in the art will appreciate that the command packet may alternatively be identified as being an irrelevant command packet, and not necessarily corrupted. In such situations, the command packet will be ignored and discarded without affecting the playback of the other data portions of the TS.

In certain embodiments, the present invention is implemented in a personal video recorder (PVR) system. A personal video recorder system may offer consumers a hard disk-based VCR that is operable to receive and record a live TV program while offering the versatility of select playback and associated special features. The personal video recorder is also operable to receive data from any number of other sources as well.

One of the most important features is providing the ability to the consumer to pause viewing of a live broadcast, for a variable length of time while the unit continues to record, and then resume continuous view from the point of departure. This is often referred to as "time-shifting." In addition, since the programs are recorded digitally, the viewer can also take advantage of trick play features such as pause, fast forward, slow forward, rewind, slow reverse, skip, etc. Certain of these aspects, among others, are disclosed below in various embodiments of the present invention.

Figure 2:
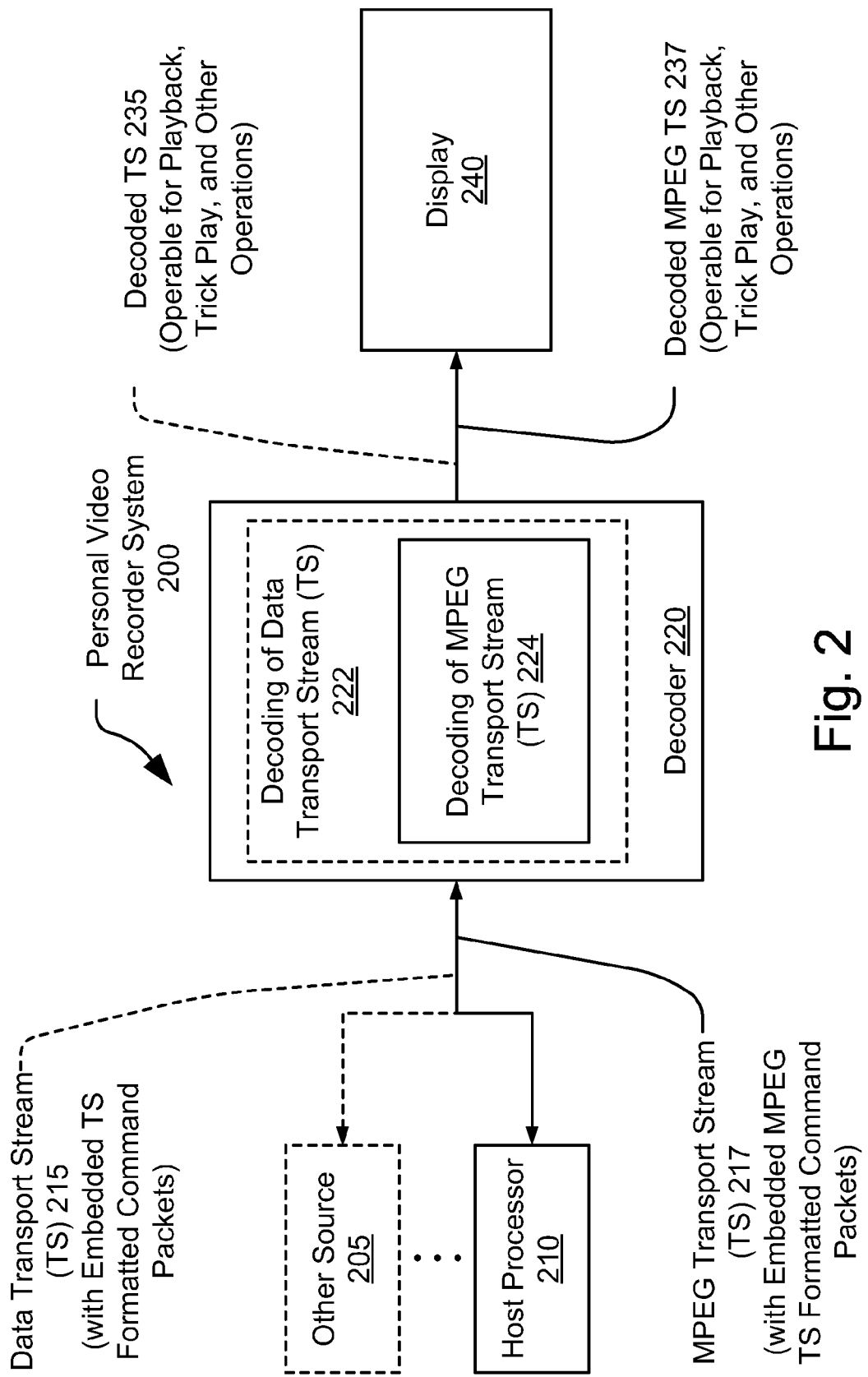
FIG. 2 is a system diagram illustrating an embodiment of a personal video recorder system that is built in accordance with certain aspects of the present invention.

FIG. 2 is a system diagram illustrating an embodiment of a personal video recorder system 200 that is built in accordance with certain aspects of the present invention. The personal video recorder system 200 includes a decoder 220 that receives a data transport stream (TS) 215 from some source. The TS 215 may be received by the decoder 220 from a host processor 215, . . . , or any other source 205 without departing from the scope and spirit of the invention. The TS 215 contains embedded TS formatted command packets. From certain perspectives, the TS formatted command packets may be viewed as being command packets, having a form of an ordinary TS data packet in terms of configuration and arrangement, that are inserted within the TS 215. In certain embodiments, an MPEG TS 217, having embedded MPEG TS formatted command packets, is provided by either one or both of the host processor 215, . . . , or the any other source 205 to the decoder 220.

The decoder 220 is operable to perform decoding of the TS 215, as shown in a functional block 222 within the decoder 220. Similarly, the decoder 220 is operable to perform decoding of the MPEG TS 217, as shown in a functional block 224 within the decoder 220. The now decoded TS 235, is passed to an output device shown as a display 240. Again, other output devices may be employed to accommodate various data types, including audio data types. The use of a display 240 is used to show the exemplary situation of video data TSs. The display 240 is operable to perform playback of the now decoded TS 235. The decoded TS 235 may be of various data types, including audio and video data types.

The decoded TS 235 is now operable for playback, trick play, and other operations within the output device. In one particular situation, the decoded TS may be a decoded MPEG TS 237 that is operable for playback, trick play, and other operations. The command packets, that were formatted into the appropriate TS format within the TS 215, are decoded to direct the manner in which portion of the TS 215 are to be handled. The TS formatted command packets do not interfere with the remaining portions of the TS, in that, they appear simply to be other packets within the TS in terms of format.

When the TS 215 is decoded, a system that is operable to perform trick play and that is operable to decode and extract the commands within the command packets, will implement the commands to direct the appropriate handling of the other portions of the TS. However, if the system is incapable to provide the trick play functionality, then the command packets will simply be identified as corrupted data and/or irrelevant data and discarded, as understood by those persons having skill in the art. Even conventional systems are operable to detect a corrupted data packet and/or irrelevant data packet. For systems incapable to perform the decoding and performance of the command contained within the TS formatted command packets, the TS formatted command packets do not substantially interfere with the normal playback of the TS. That is to say, in the context of video playback, there is not substantial interference with the playback of the video data such that a viewer will perceive a substantial reduction in perceptual quality. Analogously, in the in the context of audio playback, there will not be a substantial interference with the playback of the audio data such that a listener will perceive a substantial reduction in perceptual quality.

Figure 3:
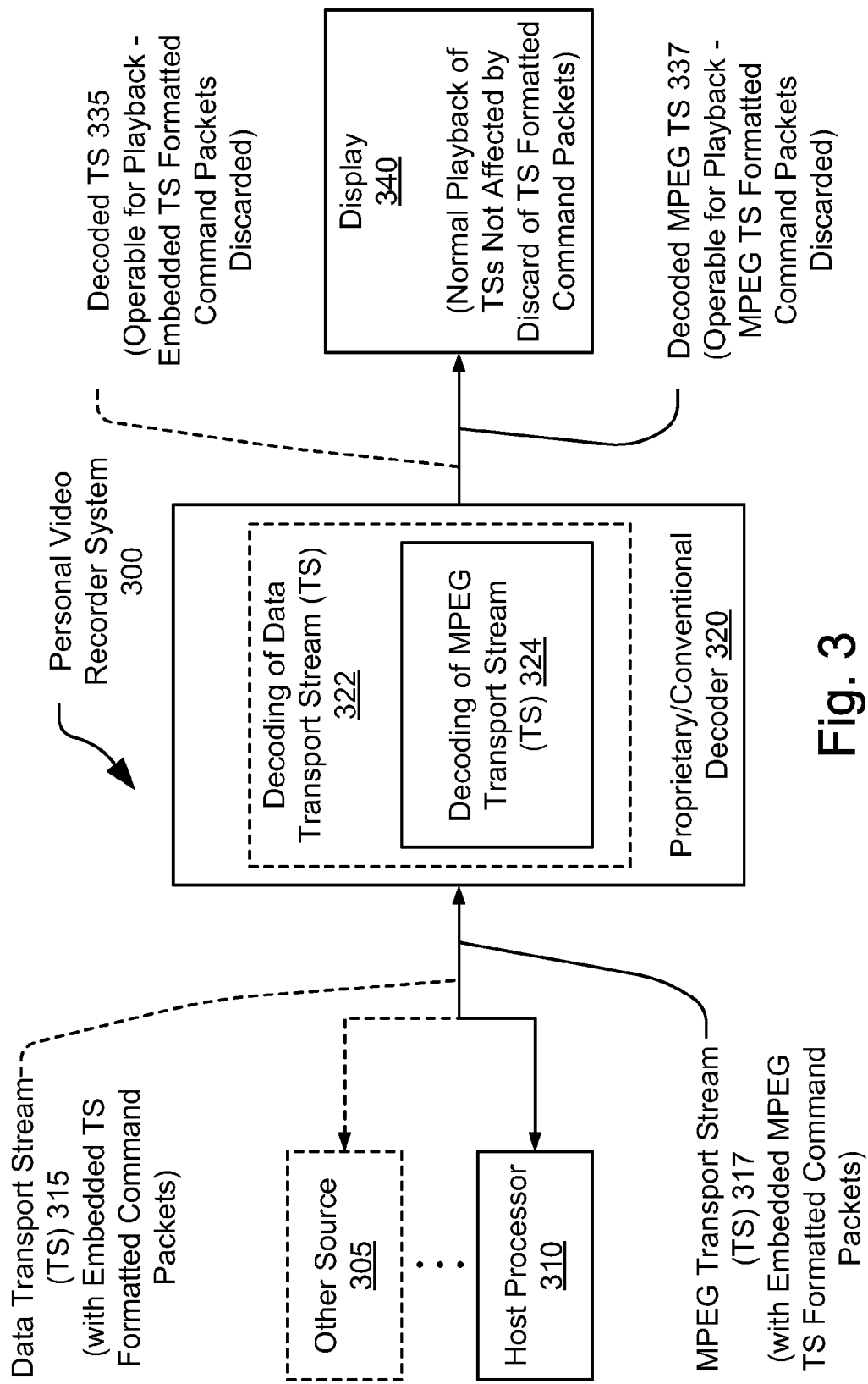
FIG. 3 is a system diagram illustrating another embodiment of a personal video recorder system that is built in accordance with certain aspects of the present invention.

FIG. 3 is a system diagram illustrating another embodiment of a personal video recorder system 300 that is built in accordance with certain aspects of the present invention. The personal video recorder system 300 includes a proprietary/conventional decoder 320 that receives a data transport stream (TS) 315 from some source. The TS 315 may be received by the proprietary/conventional decoder 320 from a host processor 315, . . . , or any other source 305 without departing from the scope and spirit of the invention. The TS 315 contains embedded TS formatted command packets. From certain perspectives, the TS formatted command packets may be viewed as being command packets, having a form of an ordinary TS data packet in terms of configuration and arrangement, that are inserted within the TS 315. In certain embodiments, an MPEG TS 317, having embedded MPEG TS formatted command packets, is provided by either one or both of the host processor 315, . . . , or the any other source 305 to the proprietary/conventional decoder 320.

The proprietary/conventional decoder 320 is operable to perform decoding of the TS 315, as shown in a functional block 322 within the proprietary/conventional decoder 320. Similarly, the proprietary/conventional decoder 320 is operable to perform decoding of the MPEG TS 317, as shown in a functional block 324 within the proprietary/conventional decoder 320. The now decoded TS 335, is passed to an output device shown as a display 340. Again, other output devices may be employed to accommodate various data types, including audio data types. The use of a display 340 is used to show the exemplary situation of video data TSs. The display 340 is operable to perform playback of the now decoded TS 335. The decoded TS 335 may be of various data types, including audio and video data types.

In this particular embodiment, the proprietary/conventional decoder 320 is inoperable to perform any trick play as directed by the commands within the TS formatted command packets. Alternatively, the proprietary/conventional decoder 320 is inoperable to perform decoding of the commands within the TS formatted command packets. In this situation, the now decoded TS 335 will be operable for normal playback. Those TS formatted command packets, that were contained within the TS 315, will be ignored and discarded. This ignoring and discarding will not interfere with the playback of the other portions of the decoded TS 335.

When the TS 315 is decoded, and given that the proprietary/conventional decoder 320 is inoperable to perform trick play and is operable to decode and to extract the commands within the TS formatted command packets, then the proprietary/conventional decoder 320 simply perceives that the TS formatted command packets are corrupted data and/or irrelevant data. The proprietary/conventional decoder 320 then discards the TS formatted command packets. This embodiment of the present invention, as shown in the FIG. 3, shows that even the proprietary/conventional decoder 320 is operable to receive and decoded, and even to playback, a TS 315 that is encoded using certain aspects of the present invention including embedding TS formatted command packets into the TS 315. The TS formatted command packets do not substantially interfere with the normal playback of the TS. That is to say, in the context of video playback, there is not substantial interference with the playback of the video data such that a viewer will perceive a substantial reduction in perceptual quality. Analogously, in the in the context of audio playback, there will not be a substantial interference with the playback of the audio data such that a listener will perceive a substantial reduction in perceptual quality.

This embodiment shows the backward compatibility of a TS that is encoded in accordance with certain aspects of the present invention. A system capable to perform decoding of the command packets, and also a system incapable to do so, may both receive a TS that is encoded using the present invention. Certain aspects of the present invention may be implemented in new and older systems without introducing any deleterious reduction in performance.

Figure 4:
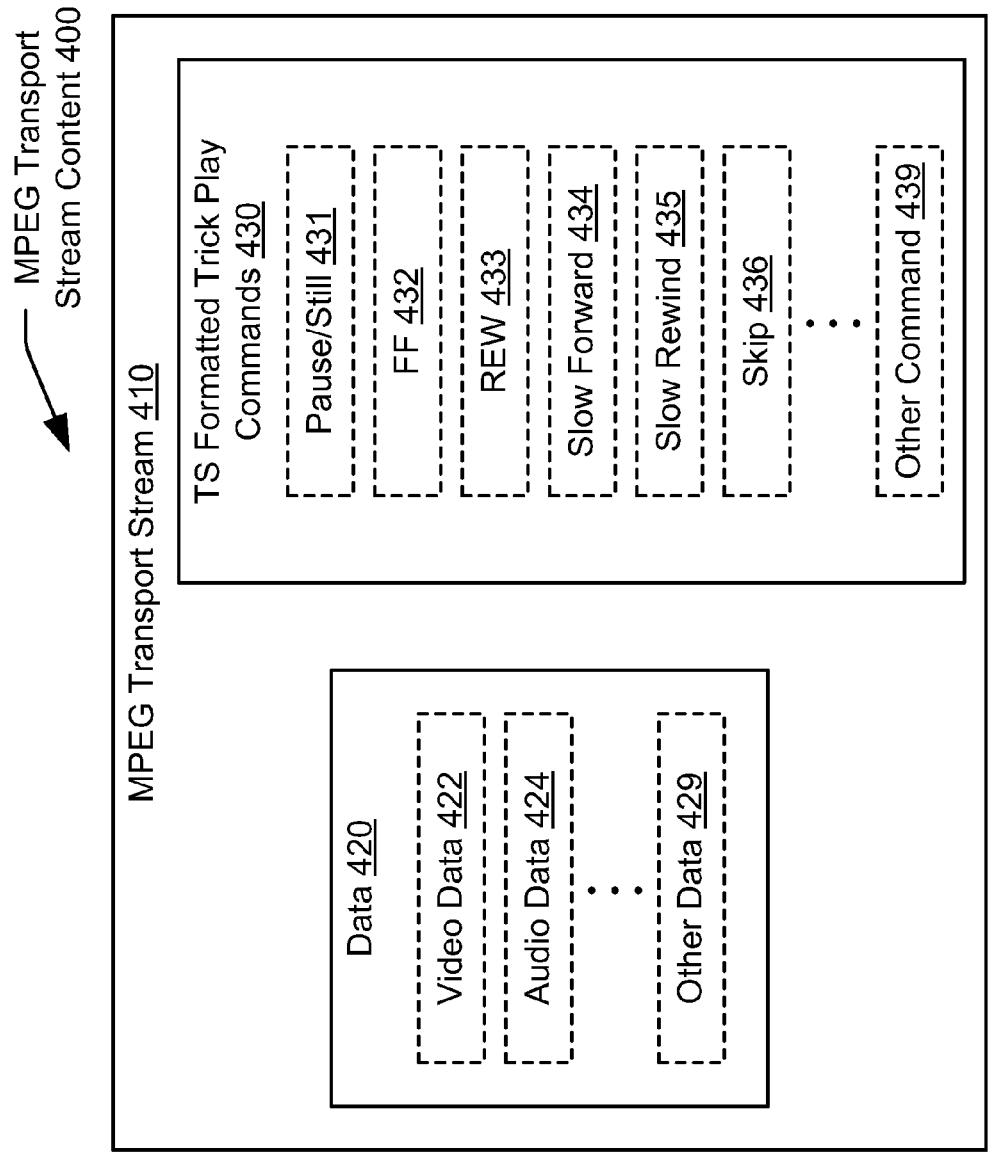
FIG. 4 is a system diagram illustrating an embodiment of motion picture expert group (MPEG) transport stream (TS) content that is configured in accordance with certain aspects of the present invention.

FIG. 4 is a system diagram illustrating an embodiment of motion picture expert group (MPEG) transport stream (TS) content 400 that is configured in accordance with certain aspects of the present invention. The MPEG TS content 400 includes an MPEG TS 410. The MPEG TS 410 includes data 420 and TS formatted trick play commands 430. The data 410 may include any one or combination of video data 422, audio data 424, . . . , and any other data type 429 as understood by those persons having skill in the art. The TS formatted trick play commands 430 may include any one or combination of commands that direct functions of pause/still 431, fast forward 432, rewind 433, slow forward 434, slow rewind 436, skip 436, . . . , and any other commands 439 as understood by those persons having skill in the art. There may also be subsets of each of the command included within the TS formatted trick play commands 430. For example, the fast forward 432 may also include options to perform FF at varying rates, such as ½-x, 2x, 3x, etc. Similarly, the rewind 432 may also include options to perform REW at varying rates, such as ½-x, 2x, 3x, etc. The other command may also include other variations as well.

Those persons having skill in the art will recognize that the data 420 within the MPEG TS 410 is formatted in a particular manner to enable and comply with MPEG TS formatting requirements. In addition, a command packet including any one or more of the TS formatted trick play commands 430 within the MPEG TS 410 are formatted in a particular manner to enable and comply with MPEG TS formatting requirements.

Moreover, certain aspects of the present invention are extendible to other variations as well. For example, other TS data formats may similarly benefit from the present invention. In other contexts, command packets may be formatted into a proper TS format and inserted within the TS as well. Certain embodiments of the present invention are geared specifically to accommodate MPEG TSs, but those persons having skill in the art will recognize that the principle of embedding command packets, the command packets being formatted in similar manner that the data is formatted within the TS format, may be employed in other application contexts as well. The implementation of these aspects will assist in the ability to eliminate a great deal of communication, command, and control interfacing between various components within personal video recorders and other systems that seek to perform decoding and presentation of data that is received via a TS.

Figure 5:
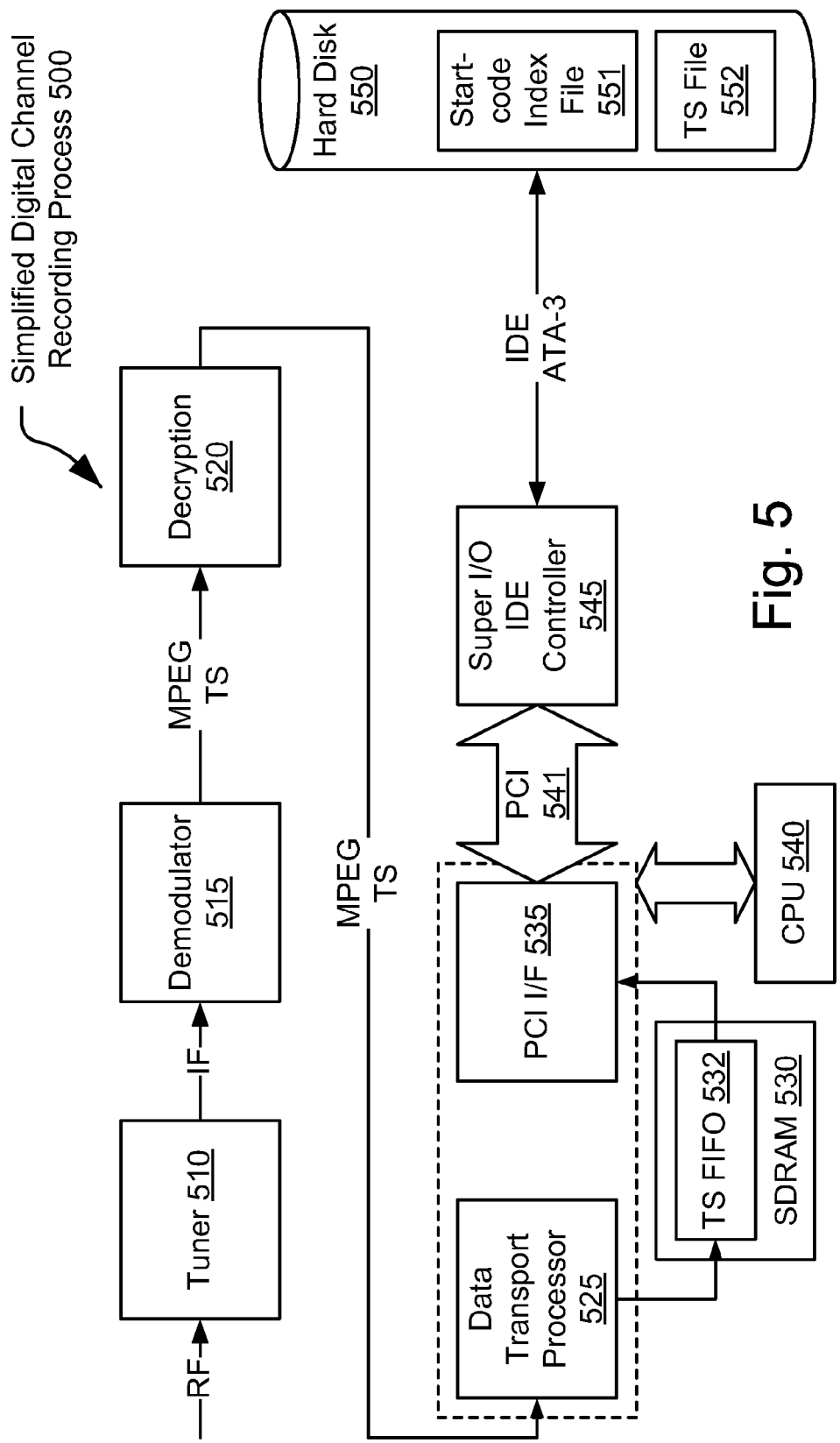
FIG. 5 is a system diagram illustrating an embodiment of a simplified digital channel recording process that is performed in accordance with certain aspects of the present invention.

FIG. 5 is a system diagram illustrating an embodiment of a simplified digital channel recording process 500 that is performed in accordance with certain aspects of the present invention. The FIG. 5 shows one embodiment where digital channel recording may be performed, in a simplified manner when compared to previous systems, using certain aspects of the present invention. The recording process of digital video stream is given in the FIG. 1. In this embodiment, a personal video recorder (PVR) digital-channel-recording process can be described as shown below.

The selected video service will be contained in a transport stream (TS) that is received as shown in a radio frequency (RF) signal that is received by a tuner 510. The tuner 510 is operable to down-convert the channel that contains the transport stream, from RF to intermediate frequency (IF). The Demodulation block, shown as a demodulator 515, demodulates the IF to base-band digital data and outputs the transport stream (shown as an MPEG TS) and sends the data to the decryption block 520.

The decryption block 520 decrypt the packets of the TS into clear data if the service is authorized. This output TS stream goes to the Data Transport Processor 525. The Data Transport Processor selects only the requested service and then re-multiplexes it into a new TS and stores the new TS data in a TS FIFO buffer 532 in synchronous dynamic random access memory (SDRAM) 530.

This new TS is then transferred to a hard disk 550. The data within the TS FIFO buffer 532 is operable to be communicates to the hard disk 550. The CPU 540 controls the storing of the data from the TS FIFO 532 to the hard drive (hard disk 550). This is done using DMA engines which sends the data over the PCI bus 541 to the super I/O controller chip 545 containing the IDE interface to the hard drive (hard disk 550) itself. If desired, the IDE ATA-3 Advanced Technology Attachment Interface with Extensions—AT Attachment 3 Interface protocol is employed between the super I/O controller chip 545 and the hard disk 550. A Start Code Index Table (SCIT) 551 is also generated and stored in the hard disk 550 (see the next section for detailed description). A TS file 552 is then stored within the hard disk 552. This TS file 552 may include exclusively data portions and also command packet portions in various embodiments.

The embodiment of the present invention shown in the FIG. 5 shows how a TS may be generated and stored in a hard disk 550 as will be understood by those persons having skill in the art. When the TS file 552 may then be read from the hard disk 550, TS formatted command packets may then also be inserted within the TS stream that is extracted from the TS file 552. Those persons having skill in the art will recognize that TS formatted command packets may be inserted into a TS at any time without compromising the quality of the data contained within the TS.

Figure 6:
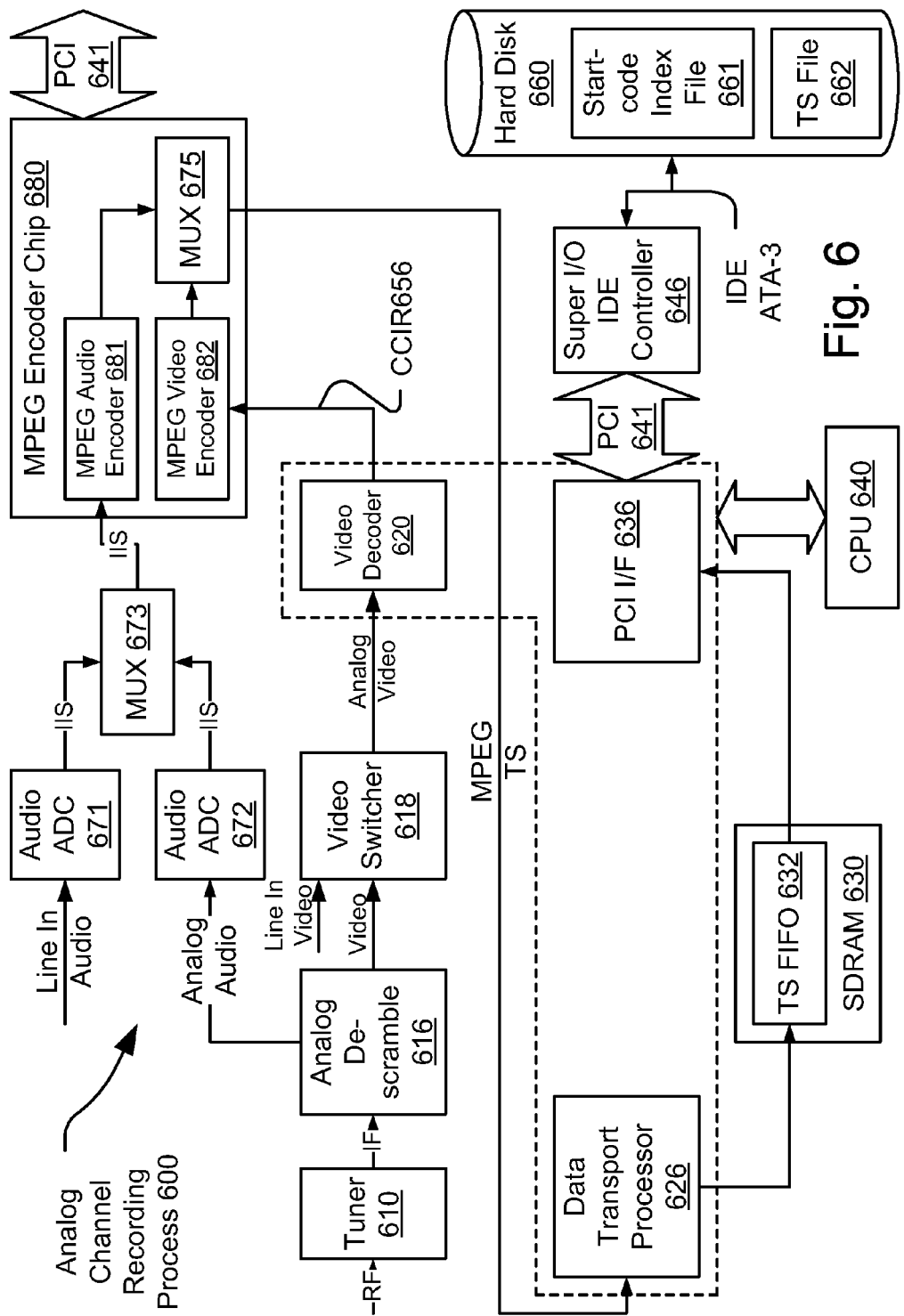
FIG. 6 is a system diagram illustrating an embodiment of an analog channel recording process that is performed in accordance with certain aspects of the present invention.

FIG. 6 is a system diagram illustrating an embodiment of an analog channel recording process 600 that is performed in accordance with certain aspects of the present invention. A personal video recorder can accept an analog channel from either the tuner or from the baseband line inputs on the back panel of its device.

The analog channel record path for each of these two cases may be described as shown below. A tuner 610 receives a radio frequency (RF) signal and down-convert the selected channel to an intermediate frequency (IF) signal. The IF signal is then passed to the analog descramble block 616. The analog descramble block 616 will then demodulate the IF to base-band analog video and audio. If the channel is encrypted, the analog descramble block 616 will also decrypt the signals (provided that it is authorized to do so). The video component from the analog descramble block 616 is passed to a video switcher block 618 from which an analog video signal is passed to a video decoder 620. The video switcher block 620 also receives a line in video signal as well. The analog audio signal, from the analog descramble block 616, is passed to an audio analog to digital converter (ADC) 672. Another audio ADC 671 is placed in parallel with the audio ADC 672; the audio ADC 671 receives a lien in audio signal. The outputs from the outputs from both the audio ADCs 671 and 672 are provided as serial I²S data streams and compresses them and multiplexes them (using MUX 675) into a serial I²S data stream that is provided to an MPEG audio encoder block 681 within the MPEG encoder chip 680.

After the video component is then passed to the video decoder 620, the video decoder 620 converts it to an 8 bit parallel data stream that is then sent to an MPEG video encoder block 682 within an MPEG encoder chip 680. The MPEG encoder chip 680 accepts the digitized video (in CCIR656 format, if desired) and digitized audio (from the MUX 675) and compresses them and then multiplexes them (using a MUX 675) to an MPEG TS. The MPEG TS is a MPEG 2 Transport Stream in one particular embodiment. If desired, this now digitized MPEG TS may be communicated to other devices via a PCI bus 641. The MPEG TS is then passed to a data transport processor 626. The TS processing in the data transport processor 626 stores the data in a TS FIFO buffer 632 in a SDRAM 630. A CPU 640 controls storing the data from the TS FIFO 632 to the hard drive/hard drive 660. This may be performed using any one or more of various DMA engines that send the data over a PCI bus 641 (after having passed through a PCI I/F 636) to a super I/O controller chip 646 containing the IDE interface to the hard drive/hard disk 660 itself. Again, the interfacing between the super I/O controller chip 646 and the hard disk 660 may be performed using the IDE ATA-3 protocol. The start code index table (SCIT) is also generated and stored in the hard drive/hard disk 660. Ultimately, a TS file 662 is stored on the hard disk 660. The TS file 662 may then be retrieved for playback or for transmission to other components or devices.

The embodiment of the present invention shown in the FIG. 5 shows how a TS may be generated and stored in a hard disk 660 as will be understood by those persons having skill in the art. When the TS file 662 may then be read from the hard disk 660, TS formatted command packets may then also be inserted within the TS stream that is extracted from the TS file 662. Those persons having skill in the art will recognize that TS formatted command packets may be inserted into a TS at any time without compromising the quality of the data contained within the TS.

Figure 7:
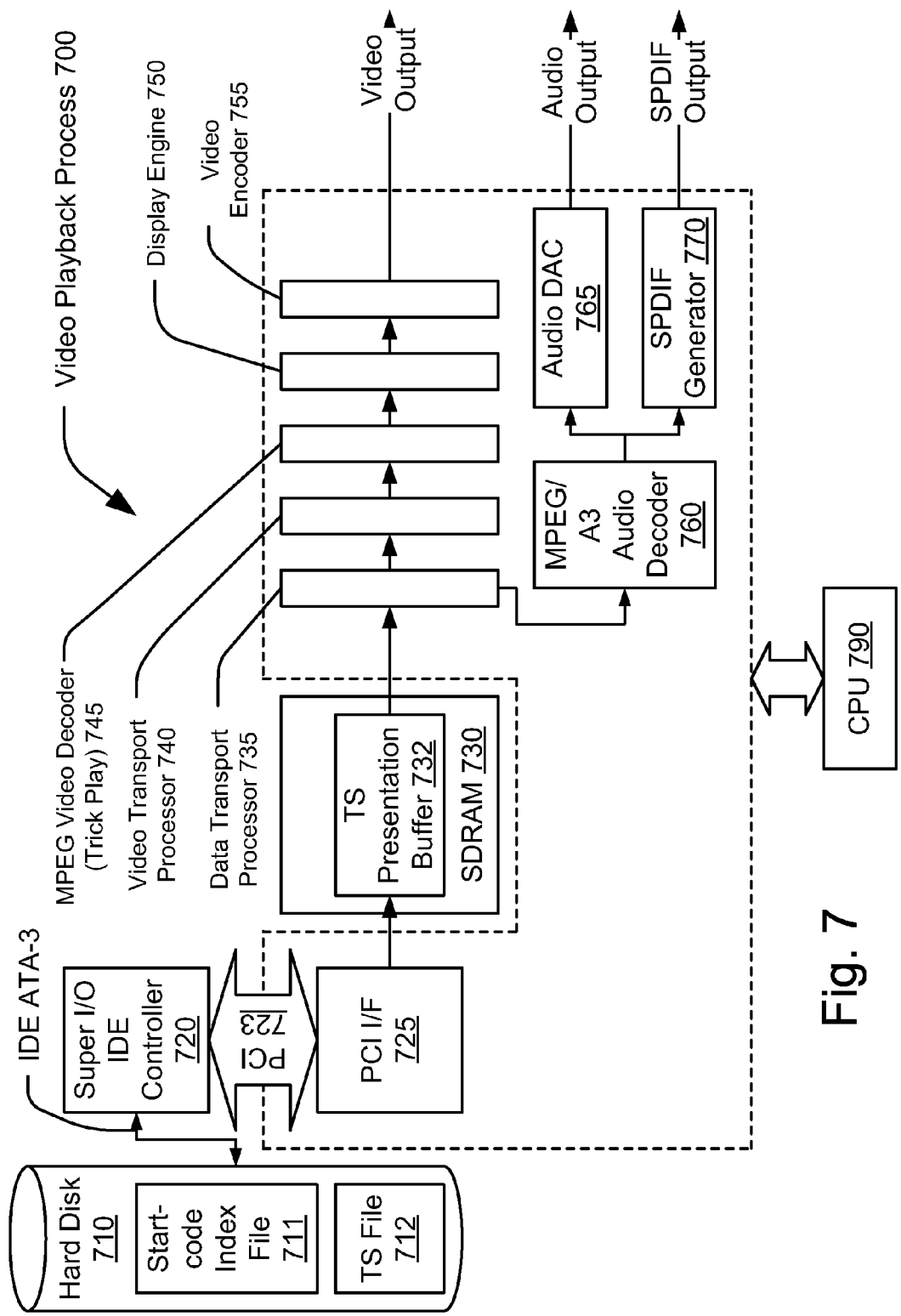
FIG. 7 is a system diagram illustrating an embodiment of a video playback process that is performed in accordance with certain aspects of the present invention.

FIG. 7 is a system diagram illustrating an embodiment of a video playback process 700 that is performed in accordance with certain aspects of the present invention. The particular example of video data retrieval and playback is shown in the FIG. 7, but those persons having skill in the art will appreciate that these aspects of the present invention are also extendible to retrieval and playback of other types of data, including audio data and other digital data types.

For a program recorded on the hard drive/hard disk 710, a personal video recorder, or other operable system, can play back that program using the steps described below in the system diagram of the FIG. 7. A processor, that may include a CPU 790, reads the TS data (shown as the TS file 712) from the hard drive/hard disk 710 based on the user selected playback mode. The correct TS data (from the TS file 712 within the hard drive/hard disk 710) is read into TS presentation buffer 732 within a SDRAM 730 using DMA engines.

Data may be read from the hard drive/hard disk 710 in a similar to the manner in which data is written into the hard drive/hard disk 710, a super I/O controller chip 720 may communicatively couple with the hard disk 710 and perform data transfer using the IDE ATA-3 protocol. The super I/O controller chip 720 then communicatively couples to the TS presentation buffer 732 within the SDRAM 730 via a PCI bus 723 and a PCI I/F 725. The data is output from the TS presentation buffer 732 and is then passed to a data transport processor 735. The data transport processor then de-multiplex the TS into its PES constituents and passes the audio TS to an audio decoder 760 and the video TS to a video transport processor 740 and then to a MPEG video decoder 745 that is operable to decode and extract embedded, TS formatted command packets, that may include instructions to perform trick play functionality. The audio data is then sent to the output blocks, and the video is sent to a display engine 750. The display engine 750 is responsible for and operable to perform scaling the video picture, rendering the graphics, and constructing the complete display among other functions. Once the display is ready to be presented, it is passed to a video encoder 755 where it is converted to analog video using an internal digital to analog converter (DAC). The digital audio is converted to analog in the audio digital to analog converter (DAC) 765 while a Sony Philips Digital Inter-Face (SPDIF) output stream is also generated and transmitted.

The FIG. 7 shows just one embodiment where a digital signal may be retrieved from a hard disk and transformed for playback. Those persons having skill in the art will also appreciate that any number of TS formatted command packets, contained within the TS file 712 as it is stored in the hard disk 710, or that are inserted into the TS during its transport throughout a personal video recorder or a video playback system. An MPEG video decoder, such as the MPEG video decoder 745, that is operable to decode, interpret, and perform the commands included within the TS may perform the directed functions without necessitating the large degree of command and control interfacing that is required in previous systems. The ability to include commands, within TS formatted command packets within a TS, eliminates a great deal of interfacing and also greatly reduces the real estate consumption within a system that performs such functions. Again, if the decoder is inoperable to decode these TS formatted command packets, then they will simply be identified as corrupted data within the TS and ignored and discarded. Clearly, the these TS formatted command packets may alternatively be identified as being irrelevant data within the TS and ignored and may also be discarded.

Figure 8:
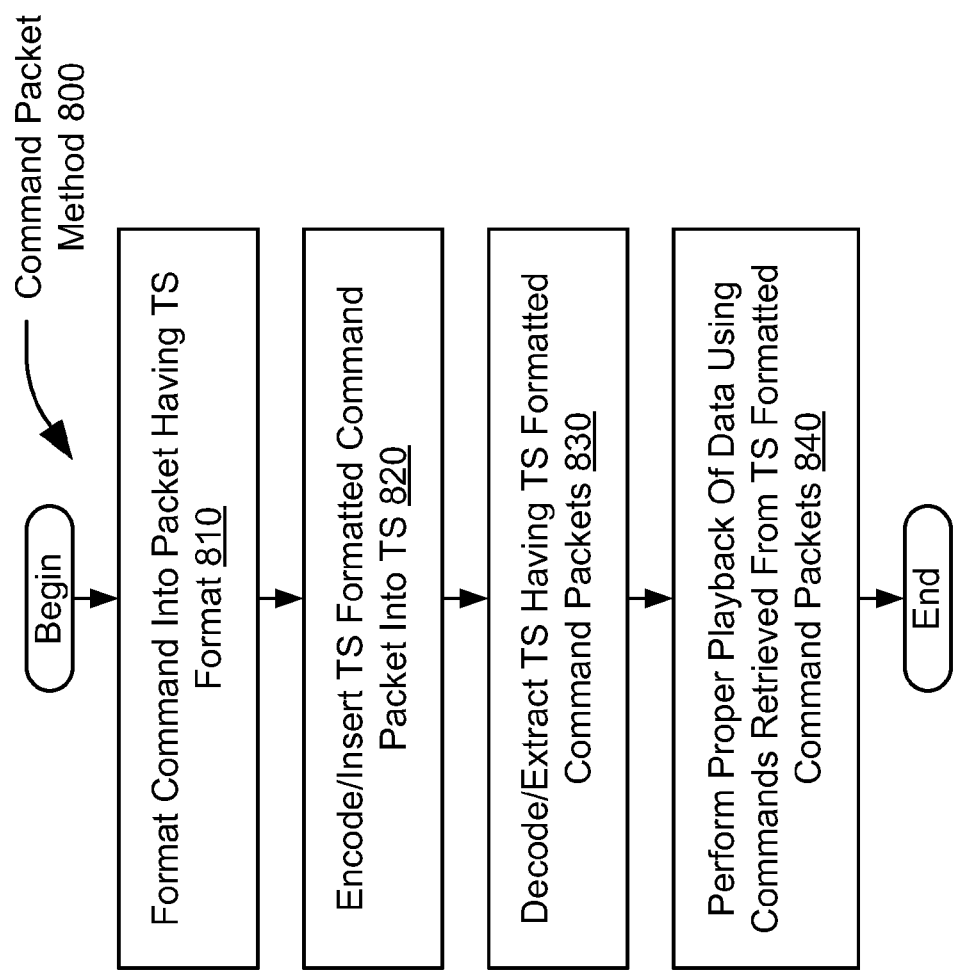
FIG. 8 is a functional block diagram illustrating an embodiment of a command packet method that is performed in accordance with certain aspects of the present invention.

FIG. 8 is a functional block diagram illustrating an embodiment of a command packet method 800 that is performed in accordance with certain aspects of the present invention. In a block 810, a command is formatted into a packet having a TS format. Then, the TS formatted command packet is encoded/inserted into the TS in a block 820. Various decisions may be used to determine where particularly the TS formatted command packet(s) is/are to be inserted within the TS. Then, in a block 830, the TS (having the TS formatted command packets) is decoded where the commands within the TS formatted command packets are extracted. In a block 840, the appropriate playback is performed using the commands that were retrieved from the TS formatted command packets.

Very generically, the embodiment of the present invention shown in the FIG. 8 shows how commands may be formatted into TS format, then inserted or encoded into a TS. Then, during the decoding of the TS, those previously encoded commands may be extracted during the decoding of the various packets of the TS. The present invention is adaptable to encoding commands, including trick play commands, into MPEG TS format and then inserting those TS formatted command packets commands into an MPEG TS. The TS formatted command packets may include how to handle the entirety of the data within the TS, or portions of data within the TS. Those persons having skill in the art will appreciate that a number of TS formatted command packets may be included within a given TS and various portions of data within the TS may be handled differently. For example, normal playback may be performed on one portion, fast forward (FF) may be performed on another portion, rewind (REW) may be performed on yet another portion, and so on. By embedding commands within the TS itself, using certain aspects of the present invention, the great deal of interfacing between various components may be greatly reduced.

Figure 9:
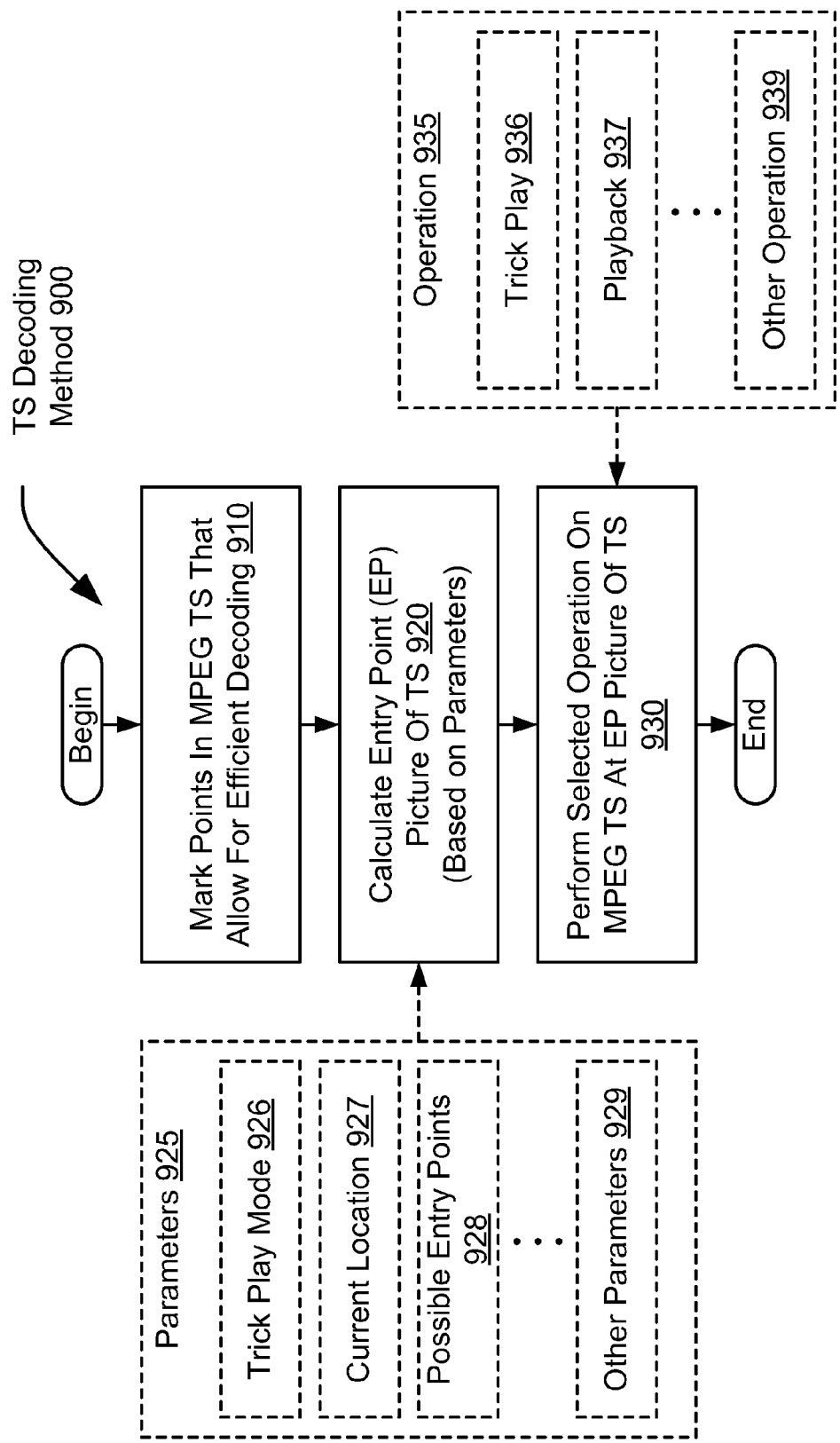
FIG. 9 is a functional block diagram illustrating an embodiment of a transport stream (TS) decoding method that is performed in accordance with certain aspects of the present invention.

FIG. 9 is a functional block diagram illustrating an embodiment of a transport stream (TS) decoding method 900 that is performed in accordance with certain aspects of the present invention. In a block 910, points within an MPEG TS are marked to allow for efficient decoding of the TS. The TS has one or more TS formatted command packets contained within it. Then, in a block 920, an entry point (EP) picture of the TS is calculated based on certain parameters of the TS. As shown in a block 925, certain of the parameters 925 may include parameters indicating a trick play mode 926, a current location 927, a number of possible entry points 928, . . . , and any other parameter 929 that may be desired in a particular application.

Then, in a block 930, the selected operation, as provided within a TS formatted command packet contained within the TS, is performed on the MPEG TS at the EP picture of the TS. The various operations 935 may include any number of operations as described here and in other embodiments of the present invention. For example, the operations 935 may include operations such as trick play 936, playback 937, . . . , and any other operation 939 that may be desired in a particular application.

As shown in this particular embodiment, a command may be included within a TS, as a TS formatted command packet, and the then decoded command packet may be used to govern the handling of portions of the TS. In addition, those persons having skill in the art will appreciate that the EP picture may be calculated at any desired point within the TS, as governed by the use and consideration of one or more of the parameters 925.

From other perspectives, in order to support trick-play modes on playback, a decoder needs a way to randomly access the recorded TS that has been stored on a hard drive. The decoder also needs to be able to maintain its real time display by limiting the data transferred to only those data that are required for building the pictures corresponding to the selected trick-play mode. One way to achieve this is to mark certain entry points in the stream that would efficiently allow a complete picture to be decoded (as shown in the block 910). The CPU could then compute the next entry point of the stream based on the current trick-play mode, its current location, and the set of possible entry points (as shown in the block 920). Then, the appropriate operation may be performed on portions of the TS (as shown in the block 930).

Also, it will be appreciated that various command operations may be associated with various portions of the TS. As mentioned above in various embodiments, normal playback may be performed on one portion, fast forward (FF) may be performed on another portion, rewind (REW) may be performed on yet another portion, and so on.

The structure of the TS formatted command packets may take on various forms without departing from the scope and spirit of the invention. Any format where the command packets may be formatted so that they may be inserted within the TS and transported in the similar manner in which the TS is communicated. The present invention is adaptable to MPEG-2 TS formats as well other TS formats where command packets are encoded into TS formatted command packets so that the command may be extracted when the TS formatted command packet is decoded.

One embodiment of the structure and organization of a MPEG-2 TS formatted command packet (as included within an MPEG-2 TS) that may be employed in a personal video recorder or other system, is described below as follows:

The collection of data points that include entry points for a video stream forms a Start Code Index Table (SCIT), and the SCIT is stored in the hard drive in a recording processes (see FIGS. 5 and 6 for two possible embodiments). The SCIT provides important information about the location of all the non-slice start codes (including the PES Start codes), and only the first slice code following a non-slice start code in a record buffer. More specifically, the SCIT contains the following fields:
1. The start code value (SCV)
2. Two bytes following the start code value (SCV): The two bytes following the slice start code can be used to check the intra_slice and intra_slice_flag fields to determine the entry point picture. In a Progressive Refresh MPEG-2 bit stream (see Appendix for definition), pictures that have the first row (slice) as Intra are deemed to be the Entry Point (EP) pictures. The CPU uses the pointer of the first slice of every picture and inspects the data in the Elementary Stream. The format of the elementary stream is as follows:

```
{
    slice_start_code                        32 bits
    quantiser_scale_code                    5 bits
    if(nextbits( ) == '1'){
        intra_slice_flag                    1 bit
        intra_slice                         1 bit
        reserved_bits                       7 bits
        while(nextbits( ) == '1'){
            extra_bit_slice /* value of 1 */    1 bit
            extra_information_slice         8 bits
        }
    }
    extra_bit_slice /* value of 0 */        1 bit
    ...
```

The CPU then has to inspect the field intra_slice_flag. If it is found to be set, the next field intra slice is inspected. If that is found to be a '1', then the slice is deemed to be an intra slice. If the first slice is found to be an intra Slice, this picture is marked as an Entry point picture. If the intra_slice_flag is zero, or intra_slice is zero, then this slice is not an intra slice and hence this picture is not an Entry Point picture.
3. Packet offset: This gives the offset in bytes of the first zero byte of a start code pattern 00 00 01 SCV from the start of that packet.
4. Record count: Record count gives the number of bytes from the start of this record session to the start of the transport packet containing the start code for this entry. A count of zero indicates the first byte in this session.
5. Flag to indicate if any packets were dropped
6. Flag to indicate if any continuity counter error was detected
7. Flag to indicate if the transport error indicator was set in one of the recorded packets (MPEG)
8. Flag to indicate if a start code index entry was dropped due to internal buffer overflow
9. Flag to indicate if the previous PES packet had an error in its length Note: If the SCV reads a value of 0xFE, then the rest of the fields give the PTS values and not the ones mentioned above.

An SCIT can be described in the following table. The range of values M1, M2 ... can be between 0 and 187 corresponding to size of the TS packet.

| SCV | Packet Offset | Record Count | Entry Picture | | | |
|-----|---------------|--------------|---------------|---|---|---|
| E0  | M1            | N1           | NO            | ... | ... ... | ... ... |
| B3  | M2            | N2           | NO            | ... | ... ... | ... ... |
| B8  | M3            | N3           | NO            | ... | ... ... | ... ... |
| 00  | M4            | N4           | NO            | ... | ... ... | ... ... |
| ... | ...           | ...          | ...           | ... | ... ... | ... ... |
| 01  | M6            | N6           | YES           | ... | ... ... | ... ... |
| 00  | M7            | N7           | NO            | ... | ... ... | ... ... |
| ... | ...           | ...          | ...           | ... | ... ... | ... ... |
| 01  | M10           | N10          | NO            | ... | ... ... | ... ... |
| 00  | M11           | N11          | NO            | ... | ... ... | ... ... |
| ... | ...           | ...          | ...           | ... | ... ... | ... ... |
| 01  | M14           | N14          | NO            | ... | ... ... | ... ... |
| ... | ...           | ...          | ...           | ... | ... ... | ... ... |
| ... | ...           | ...          | ...           | ... | ... ... | ... ... |
| 00  | M48           | N48          | NO            | ... | ... ... | ... ... |
| ... | ...           | ...          | ...           | ... | ... ... | ... ... |
| 01  | M50           | N50          | YES           | ... | ... ... | ... ... |
| ... | ...           | ...          | ...           | ... | ... ... | ... ... |
| ... | ...           | ...          | ...           | ... | ... ... | ... ... |

It is also noted that the CPU picks the SCIT and linearizes the addresses as it writes to the hard disk. The packet offset and the record count points to the start code in the record life.

Figure 10:
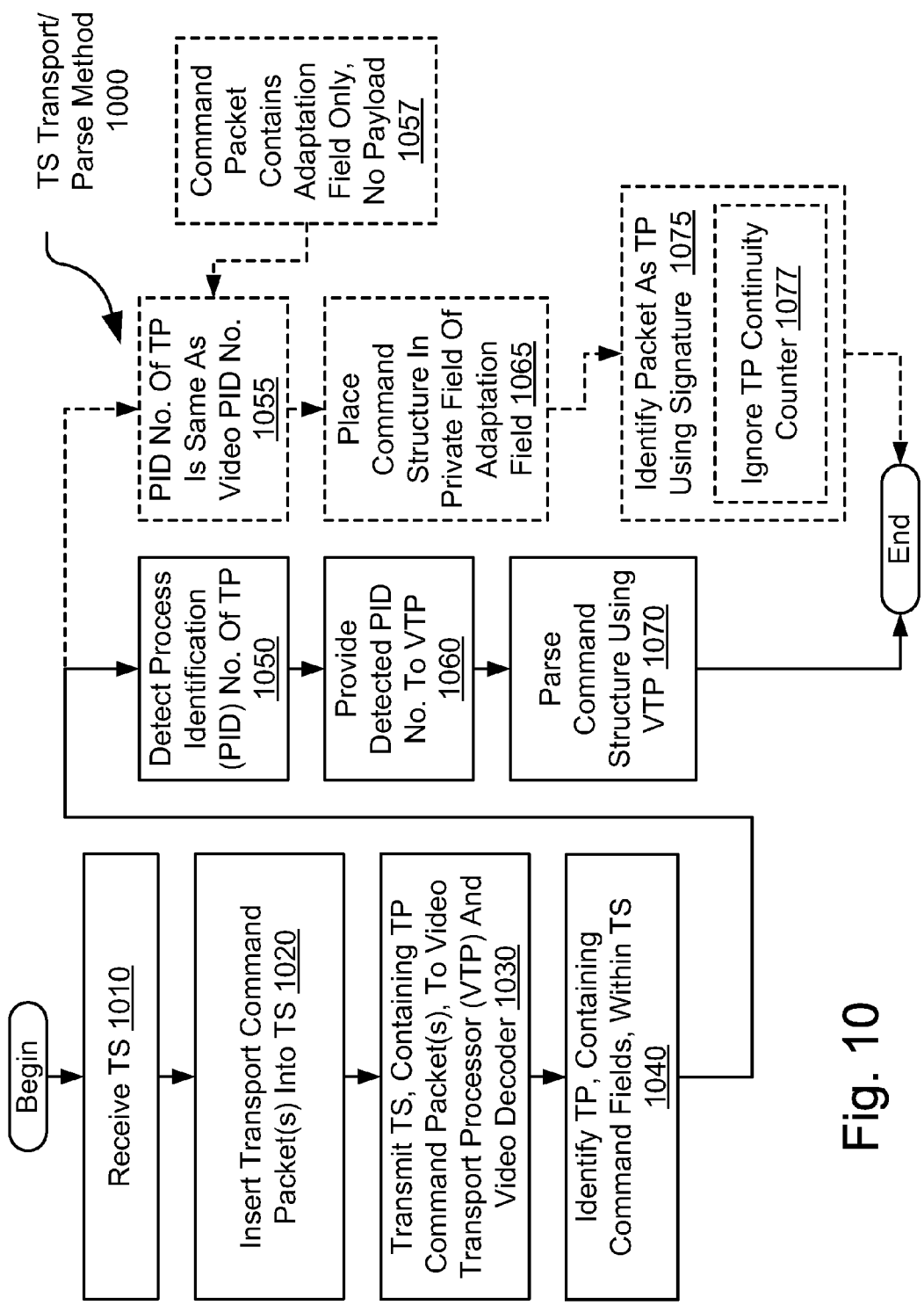
FIG. 10 is a functional block diagram illustrating an embodiment of a transport stream (TS) transport/parse method that is performed in accordance with certain aspects of the present invention.

FIG. 10 is a functional block diagram illustrating an embodiment of a transport stream (TS) transport/parse method 1000 that is performed in accordance with certain aspects of the present invention. In a block 1010, a TS is received. This may include receipt of multiple packets within a TS or a single packet within a TS. Alternatively, the entirety of the TS may be received in the block 1010. From certain perspectives, a Data Transport driver (DTD), built in accordance with certain aspects of the present invention, is responsible for data flow of the stream to be played back through a Data Transport (and/or Video Transport) Processor. In a block 1020, the DTD will also insert a "Transport Packet" (TP) into the actual TRANSPORT STREAM; the TP may be viewed as being Transport Command Packet(s)—containing various commands. The TP may be referred to as another terminology for a TS formatted command packet as described in other of the various embodiments of the present invention. The terminology of a TP and a TS formatted command packet may be used interchangeably. Then, in a block 1030, the TS (that now contains the TS formatted command packet) is transmitted to a Video Transport Processor (VTP) and a Video decoder. Thereafter, in a block 1040, that TP (or TS formatted command packet) is then identified. There exist several options understood by those persons having skill in the art for uniquely identifying a type of packet from among a group of packets. Here, the TP/TS formatted command packet is identified using any of a number of methods. The "Transport Packet"/TS formatted command packet that contains the command fields.

There exist a number of options in which to parse the command structure of a TP/TS formatted command packet. Two particular embodiments are described in the FIG. 10.

A First Option:

In a block 1050, the process identification (PID) number of the TP/TS formatted command packet is identified. If desired, a CPU indicates the PID number of the TP. Then, in a block 1060, this detected PID number is provided to a Video Transport Processor (VTP). Then, in a block 1070, a command structure is parsed accordingly. This may be performed using the VTP. It is also noted that this option means that firmware flow must then be disturbed to accommodate handling of such PID numbers.

A Second Option:

In this option, the PID number of the TP/TS formatted command packet is the same as the video PID number, as shown in a functional block 1055. If desired in this situation, the command packet contains an Adaptation Field only and no payload, as shown in a functional block 1057. Then, in a block 1065, the command structure is placed in a private field of the adaptation field. Then, a signature uniquely identifies this packet as a TP/TS formatted command packet in a block 1075. A 32-bit signature may be used in certain embodiments. In addition, a continuity_counter of the TP/TS formatted command packet is ignored as shown in a block 1077 within the functional block 1075.

Some other considerations may be implemented to perform this second option as well. The field structure of the TP/TS formatted command packet is shown in the table below. All the Video related command/parameter fields are explained in the next section.

A TP/TS formatted command packet shall come prior to the packet containing the corresponding PICTURE_START. The command in a TP/TS formatted command packet is valid over all the pictures given by the command and all the packets given by the PICTURE_START and PICTURE_END fields. This means that a TP/TS formatted command packet can be encountered by the Video Transport before the count provided by the previous TP/TS formatted command packet.

Figure 11:
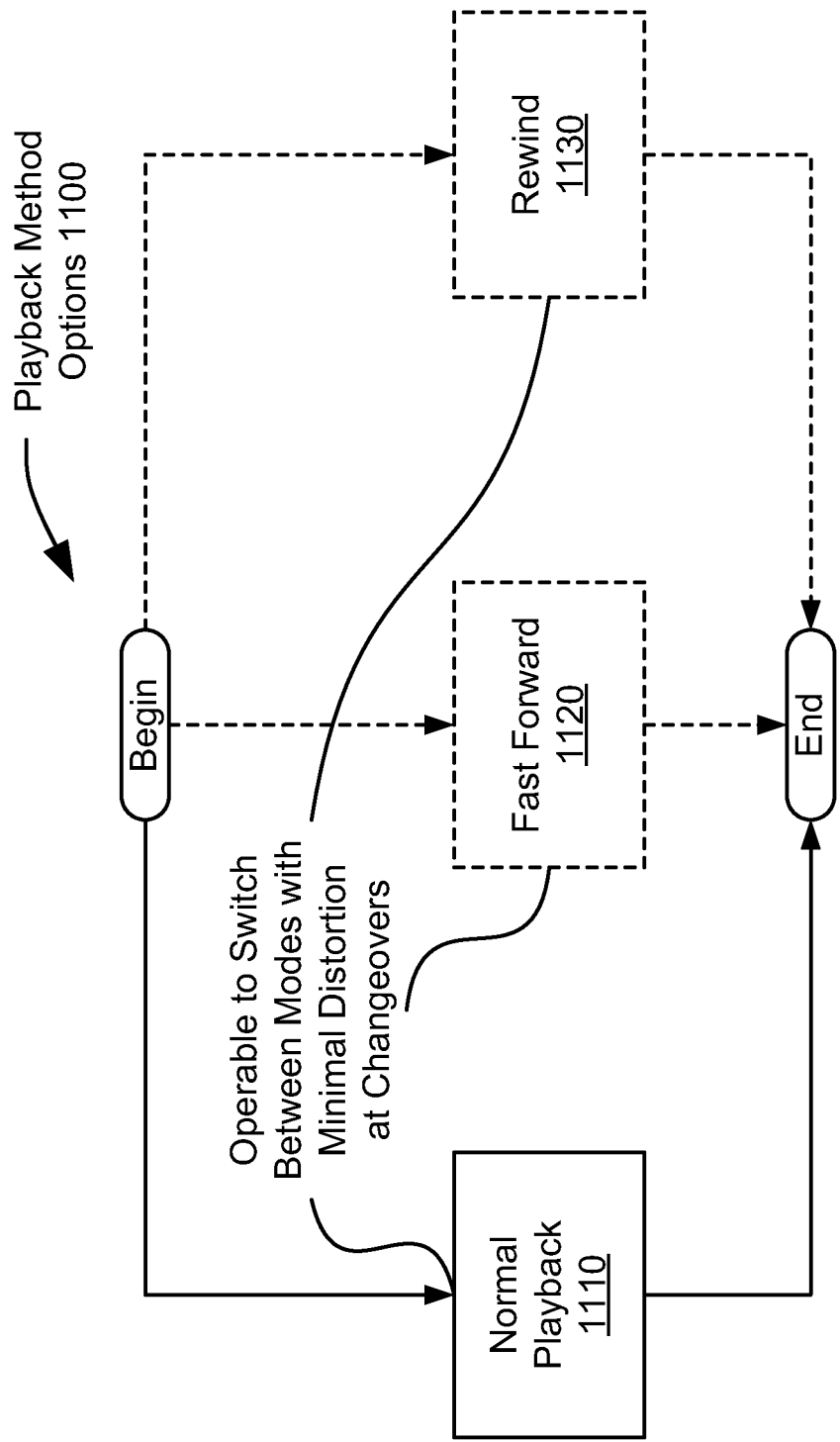
FIG. 11 is a functional block diagram illustrating an embodiment of playback method options that may be performed in accordance with certain aspects of the present invention.

FIG. 11 is a functional block diagram illustrating an embodiment of playback method options 1100 that may be performed in accordance with certain aspects of the present invention. The playback that may be performed using aspects of the present invention essentially fall into three different modes, Normal playback 1110, Fast Forward 1120, and Rewind 1130. A user should be able to switch between these modes with minimal distortions at changeovers. During Playback, a CPU reads the data from the hard disk and places it in Playback buffers in the DRAM belonging to the chip. The CPU operates on segments of the elementary stream (ES) from one Entry Point (EP) picture to the other. It determines the EP picture by inspecting the two bytes following the start code value (SCV).

Figure 12:
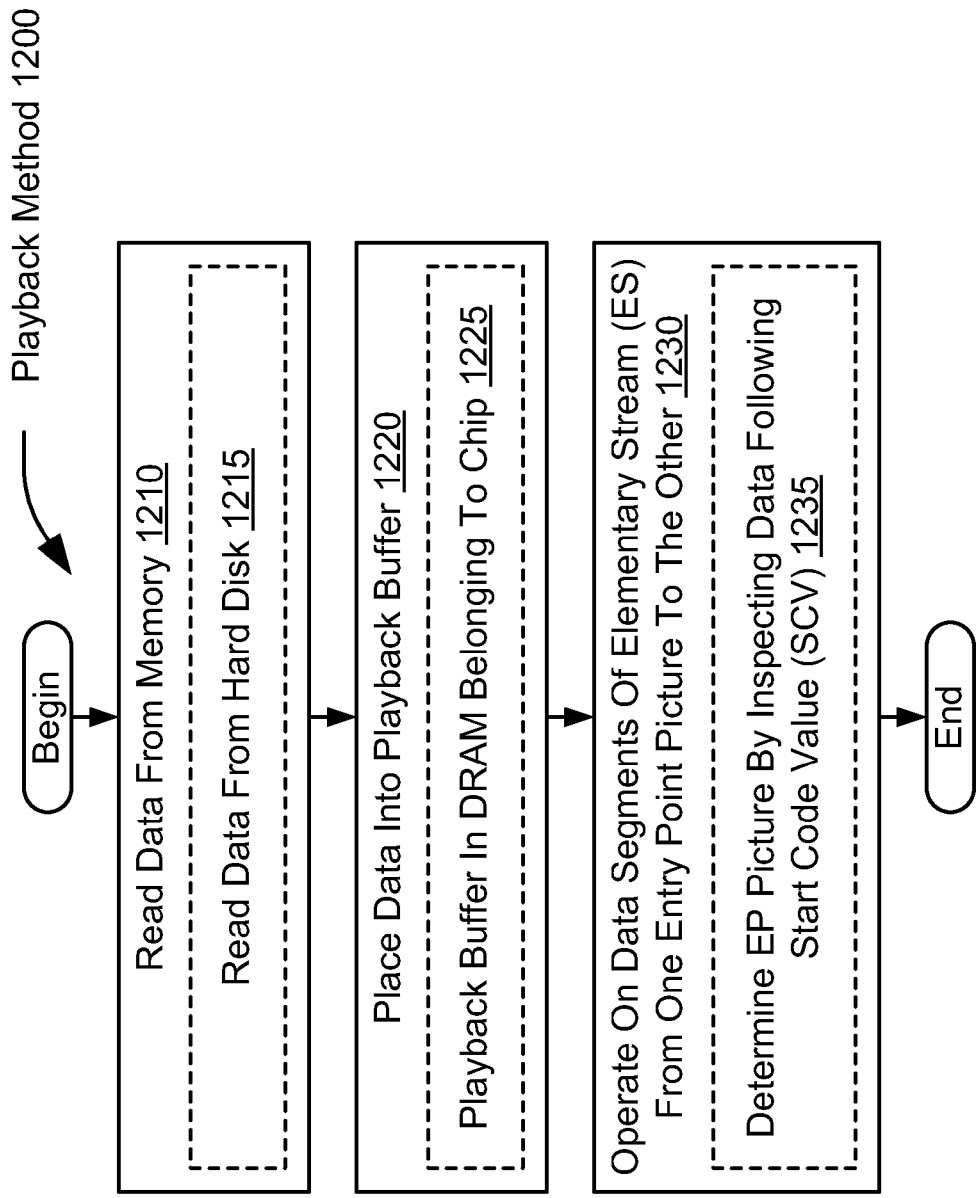
FIG. 12 is a functional block diagram illustrating an embodiment of a playback method that is performed in accordance with certain aspects of the present invention.

FIG. 12 is a functional block diagram illustrating an embodiment of a playback method 1200 that is performed in accordance with certain aspects of the present invention. During Playback, data is read from memory in a block 1210. This reading of data is from the hard disk in certain embodiments. Then, in a block 1220, the data is placed in a playback buffer. These playback buffers are in the DRAM belonging to the chip, as shown in a block 1225 in certain embodiments. Then, in a block 1230, the data segments of the elementary stream (ES) from one entry point (EP) picture to the other EP picture of the data segment. Moreover, the determination of the EP picture is made by inspecting the two bytes following the start code value (SCV) as shown in a block 1235.

| Exemplary field structure of the TP/TS formatted command packet | | |
|---|---|---|
| FIELD | NO OF BITS | VALUE |
| SYNC_BYTE | 8 | 47H |
| TRANSPORT_ERROR_INDICATOR | 1 | 0 |
| PAYLOAD_UNIT_START_INDICATOR | 1 | 0 |
| TRANSPORT_PRIORITY | 1 | 0 |
| PID | 13 | VIDEO_PID in Hex |
| TRANSPORT_SCRAMBLING_CONTROL | 2 | 00B |
| ADAPTATION_FIELD_CONTROL | 2 | 10B |
| CONTINUITY_COUNTER | 4 | X |
| ADAPTATION_FIELD_LENGTH | 8 | 183D |
| ADAPTATION_FLAG | 8 | 02H or 82H |
| TRANSPORT_PRIVATE_DATA_LENGTH | 8 | 15D |
| ALIGN_BYTE | 8 | 0 |
| SIGNATURE_32BITS | 32 | 4252434DH |
| MODE | 32 | MODE |
| SKIP_COUNT | 32 | SKIP_COUNT |
| DISPLAY_COUNT | 32 | DISPLAY_COUNT |
| PICTURE_START_PACKET | 32 | PICTURE_START_PACKET |
| PICTURE_START_BYTE | 32 | PICTURE_START_BYTE |
| PICTURE_END_PACKET | 32 | PICTURE_END_PACKET |
| PICTURE_END_BYTE | 32 | PICTURE_END_BYTE |
| DISCARD_HEADEND | 32 | DISCARD_HEADEND |
| DISCARD_TAILEND | 32 | DISCARD_TAILEND |
| DXPORT_VALUE | 32 | DXPORT_VALUE |
| STUFFING_BYTE | 132 bytes | XX |

Note:
The structure of the TP/TS formatted command packet follows the syntax of MPEG 2 Transport Header.
XX means don't care. Such fields are not considered by the Video transport for TP/TS formatted command packet.
The 32-bit signature 0x4252434d is the ASCII value of "BRCM".
The PICTURE_START_PACKET and PICTURE_START_BYTE represent i and j of the field PICTURE_START denoted by $TPB_{i,j}$.
The PICTURE_END_PACKET and PICTURE_END_BYTE represent i and j of the field PICTURE_END denoted by $TPB_{i,j}$.

Figure 13:
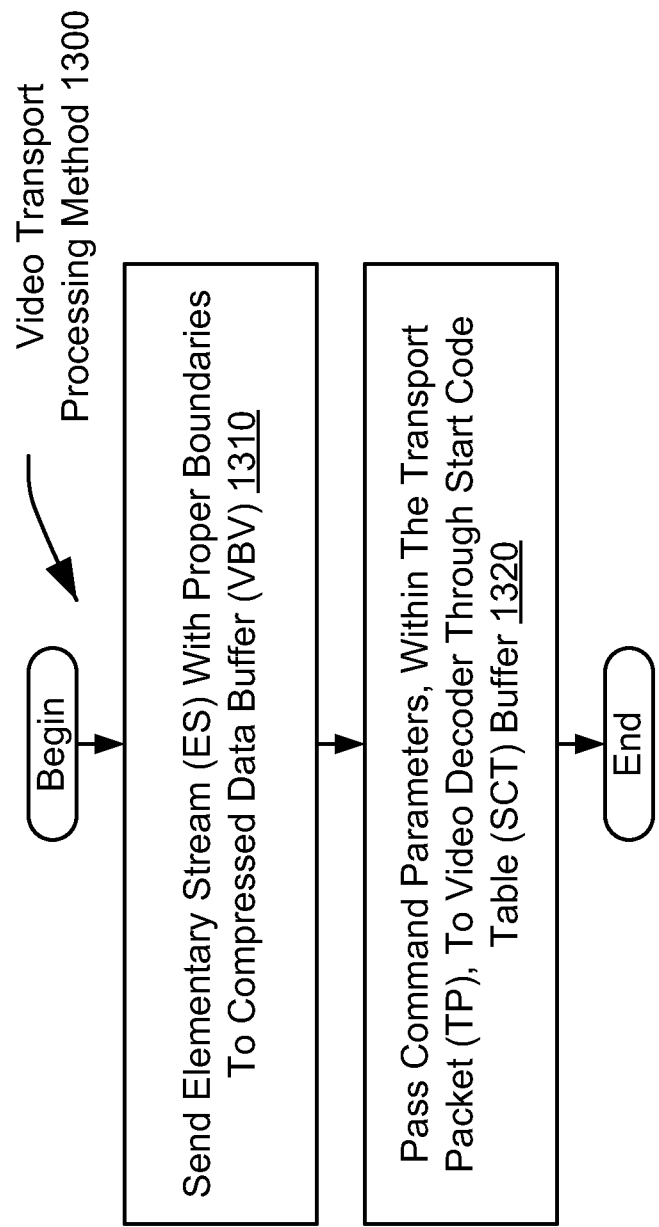
FIG. 13 is a functional block diagram illustrating an embodiment of a video transport processing method that is performed in accordance with certain aspects of the present invention.

FIG. 13 is a functional block diagram illustrating an embodiment of a video transport processing method 1300 that is performed in accordance with certain aspects of the present invention. In the Transport based PROGRESSIVE REFRESH STREAM, the VIDEO TRANSPORT PROCESSOR is responsible for sending the elementary stream (ES) with proper boundaries to the VBV (compressed data buffer). This may be described as shown in a block 1310 where an elementary stream (ES) with the proper boundaries is sent to the VBV (compressed data buffer). It also passes some of the command parameters in the TP/TS formatted command packet to the MPEG VIDEO DECODER through a start code table (SCT) Buffer. This may be described as shown in a functional block 1320. It is also noted that this SCT buffer should not be confused with the SCIT generated in the data transport.

The data flow of the Playback stream is described below in the following Figures and disclosure during the different modes of operation. The following notations are presented to assist in explaining the data flow of a TS in accordance with certain aspects of the present invention.

$EP_m$ denotes the $m^{th}$ Entry Point Picture, where m is an integer, that represents an arbitrary entry point.

$P_{m,n}$ denotes $n^{th}$ Picture after $m^{th}$ Entry Point Picture, where m and n are integers. This means that $P_{m,0}$ are the pictures with intra-slice fields set.

$EP_m$ to $EP_{m+1}$ form segment m, $EP_{m+1}$ to $EP_{m+2}$ form segment m+1 and so on $TPB_{i,j}$ means the Transport Packet Byte at an offset j from byte zero in the transport packet ii from the current packet. This will be used extensively for pointing to a start code and the packet containing it from the TP/TS formatted command packet.

The following commands need to be given by the Data Transport to the VIDEO TRANSPORT PROCESSOR through the TP/TS formatted command packet. The command is applicable for all the pictures following this TP/TS formatted command packet till the picture pointed by the next TP/TS formatted command packet. Here, a "command" means the concatenation of all the following fields.

MODE: This field gives the following commands to the Video Transport and the Decoder

| 00 | PLAY |
| 01 | DISPLAY |
| 02 | BUILD_REFERENCE |
| 03 | PROCESS |
| 04 | DISCARD_TILL_BTP |

PLAY: This command puts the Video Decoder in the normal mode. The pictures following this command are treated as any normal stream by the decoder.
DISPLAY: This command puts the Video Decoder in the display mode. For a given picture sequence, the Video Decoder decodes all the pictures but displays only the last of the "displayable" picture
BUILD_REFERENCE: This command puts the Video Decoder in the decode mode. For a given segment, the Video Decoder builds a reference picture.
PROCESS: This command causes the Video Transport to process DISCARD_HEADEND and DISCARD_TAILEND only. The SKIP_COUNT and DISPLAY_COUNT fields are not sent to the Video Decoder. This command is meant for Video Transport.
But note that the DISCARD_HEADEND and DISCARD_TAILEND fields are processed for all the above commands.
DISCARD_TILL_BTP: This causes the Video Transport to discard only the video ES data bytes starting from the transport packet that follows till the next BTP for that PID. When this field is zero, the Video Transport will not discard ES till the next BTP.
SKIP_COUNT: This field specifies the number of pictures to be skipped before sending a picture to display. Using the Play command with a skip count of 1 achieves a fast forward (FF) of ×2. If the picture to be skipped is a B picture, it is also skipped from processing.
DISPLAY_COUNT: This field specifies the number of displayable pictures starting from the picture that follows the TP/TS formatted command packet for which the corresponding command has to be used.
Typically,
   this field will be "0" for BUILD_REFERENCE mode
   this field will be "1" for Rewind mode
   this field will be equal to number of pictures in an EP segment in the normal playback mode
   this field will be equal to (int) ((number of pictures in an EP segment)/(skip_count+1))
PICTURE_START: This field informs the location of the start of the first picture following a TP for which the command has to be applied, by pointing to the first byte of the start code sequence from the start of the packet in which it is present. This is represented by $TPB_{i,j}$.
PICTURE_END: This field informs the location of the start of a picture following a TP/TS formatted command packet over which the command has to be applied. This means the command is valid for all the pictures starting from the PICTURE_START till the picture preceding the one indicated by this field. This is represented by $TPB_{i,j}$ and gives first byte of the start code sequence from the start of that packet.
DISCARD_HEADEND: This enables the Video Transport to discard all the bytes from the start of the payload till the offset mentioned in this field. A value of 0 means no byte has to be discarded.
This field is useful in case of Fast Forward and for decoding the sequence header
DISCARD_TAILEND: This enables the Video Transport to discard all the bytes from the offset mentioned in this field till the end of the packet. A value of 0 means no byte has to be discarded.
This field is useful in case of Fast Forward and for decoding the sequence header.
DXPORT_VALUE: The value in this field is used for piggybacking in the one of the non-slice entry in the SCV table. During the trick mode changes, the Video Decoder returns this value whenever the data transport driver calls a get (DXPORT_VALUE) function. This value could be a PTS value or an offset in the SCIT table. This ensures a quick response during the trick mode changes.

It is also noted that a "command" is applicable over all the pictures present between PICTURE_START and PICTURE_END. Again, the command may be extracted from a TP/TS formatted command packet.

Figure 14:
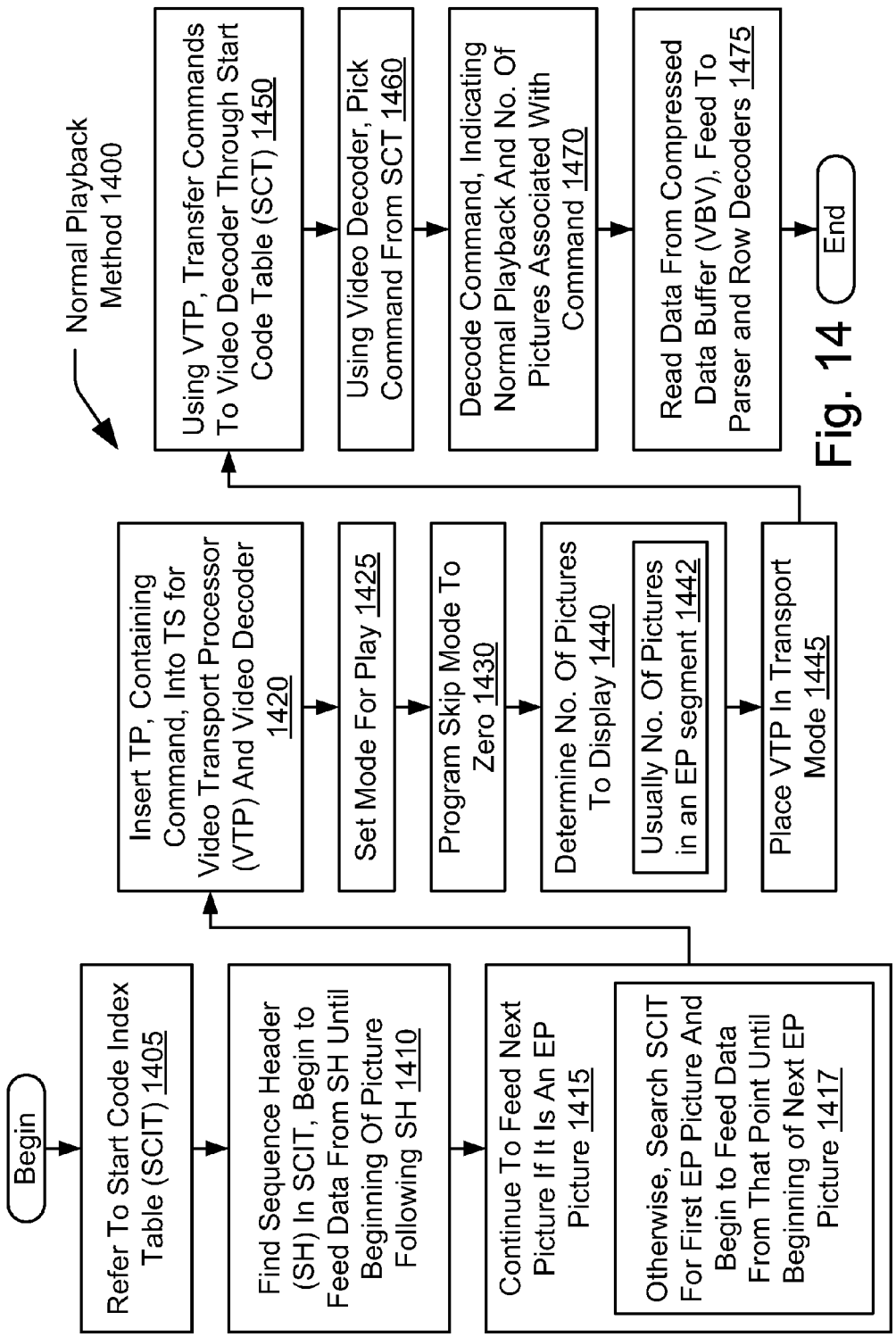
FIG. 14 is a functional block diagram illustrating an embodiment of a normal playback method that is performed in accordance with certain aspects of the present invention.

FIG. 14 is a functional block diagram illustrating an embodiment of a normal playback method 1400 that is performed in accordance with certain aspects of the present invention. Now, using the general mechanism and the commands listed above, the normal playback method 1400 may be achieved in the following manner. In a block 1405, a CPU refers to the start code index table (SCIT) that it had picked during the record function. Then, in a block 1410, the CPU finds a Sequence Header (SH) in the SCIT and begins to feed the data from that Sequence Header until the beginning of the picture following the Sequence Header.

If the next picture is an entry point (EP) picture, then it continues to feed the data from that picture as shown in a block 1415. However there is an exception. If the first picture after the Sequence header and the corresponding extensions is not an EP picture, then the CPU searches the SCIT for the first EP picture and begins feeding data from that point till the beginning of the next EP picture as shown in a block 1417 within the functional block 1415.

In a block 1420, the CPU also inserts a TP/TS formatted command packet (containing the command) for the VIDEO TRANSPORT PROCESSOR and the video decoder. The MODE is set for PLAY in a block 1425, and the SKIP_COUNT is programmed to zero in a block 1435. Then, in a block 1440, the DISPLAY_COUNT field informs the number of pictures to be displayed. Typically, this value is the number of pictures in an EP segment as shown in a block 1442. Then, the VIDEO TRANSPORT PROCESSOR is placed in the Transport Mode in a block 1445. The VIDEO TRANSPORT PROCESSOR transfers the commands to the video decoder through the start code table (SCT) in a block 1450. The Video decoder then picks a command from the Start Code Table (SCT) buffer 1460. The command is then decode in a block 1470, and the command tells the video decoder that it is Normal Playback, and then this would also give the number of pictures that command has been issued for. Ultimately, the Compressed Data Buffer (VBV) Manager is kicked off to read data from the VBV and feed it to the Parser and the Row Decoders as shown in a block 1475.

It is also noted that wherever a mention is made of the CPU sending the pictures, it is assumed that it starts from the transport packet starting with the PES that contains the picture. Using the PICTURE_START and PICTURE_END fields, the Video Transport will get to the right byte of the elementary stream in the transport packets.

The VIDEO TRANSPORT PROCESSOR is responsible for extracting from the Transport packets and sending the ES with proper boundaries to the VBV (compressed data buffer). It also passes the Video related commands/parameters in the TP to the MPEG VIDEO DECODER through SCT Buffer (this should not be confused with the SCIT generated in the data transport) for the video decoder. The VIDEO TRANSPORT PROCESSOR gets to the start and end of a picture by looking at the PICTURE_START and PICTURE_END fields, both of which, are represented by $TPB_{i,j}$.

Figure 15:
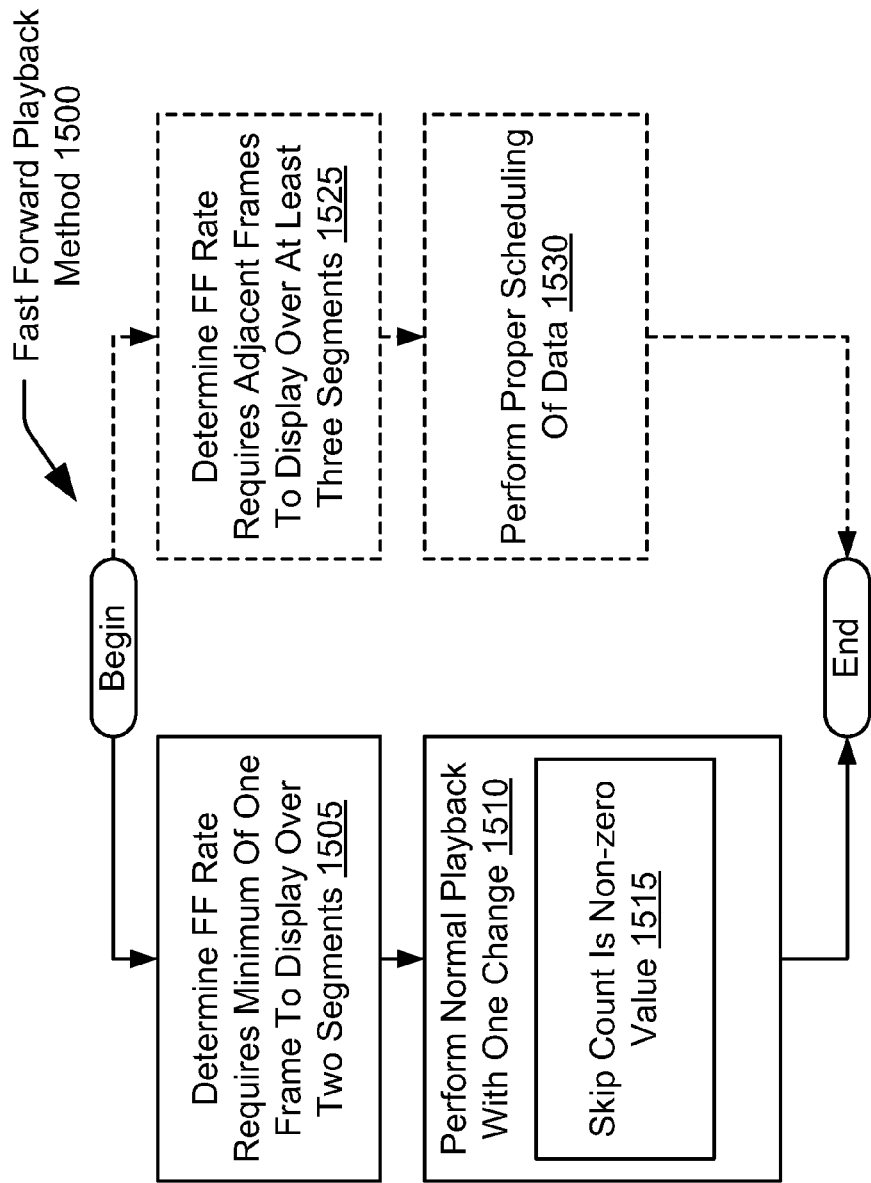
FIG. 15 is a functional block diagram illustrating an embodiment of a fast forward playback method that is performed in accordance with certain aspects of the present invention.

FIG. 15 is a functional block diagram illustrating an embodiment of a fast forward playback method 1500 that is performed in accordance with certain aspects of the present invention. There are many modes in which fast forward (FF) may be performed in accordance with the present invention. Two potential cases will be described below in the FIG. 15.

A first option is a mode in which the fast forward rate is such that there is a minimum of one frame to display over two segments as shown in a block 1505. In this case as shown in a block 1510, the CPU does not do anything different compared to the normal playback as far as feeding the data is concerned. One change, however, is that the SKIP_COUNT is a non-zero value as shown in a block 1515. A value of 1 would cause the Video Decoder to drop every other picture from the display process, achieving a Fast Forward rate of ×2.

A second option is a mode in which the fast forward rate is such that the adjacent pictures are placed over a minimum of three segments as shown in a block 1525. In this case, the CPU needs to do some scheduling of the data as shown in a block 1530.

For example, if a picture $P_{m,n}$ is to be displayed, a reference picture is built by feeding the segment between $EP_{m-1}$ to $EP_m$. The CPU needs to configure video in BUILD_REFERENCE mode. The SKIP_COUNT needs to be programmed to x−1 and DISPLAY_COUNT needs to be 0, where x is the total number of pictures in the segment.

The CPU then feeds the pictures $P_{m,0}$ to $P_{m,n}$ in the segment from $EP_m$ to $EP_{m+1}$, which is to be used for the actual decode and display. The video has to be configured in PLAY mode. The CPU programs the DISPLAY_COUNT to 1 and the SKIP_COUNT with n−1 to display the picture $P_{m,n}$.

This second mode or case of fast forward is similar to the rewind, which is described in detail in the next section.

Figure 16:
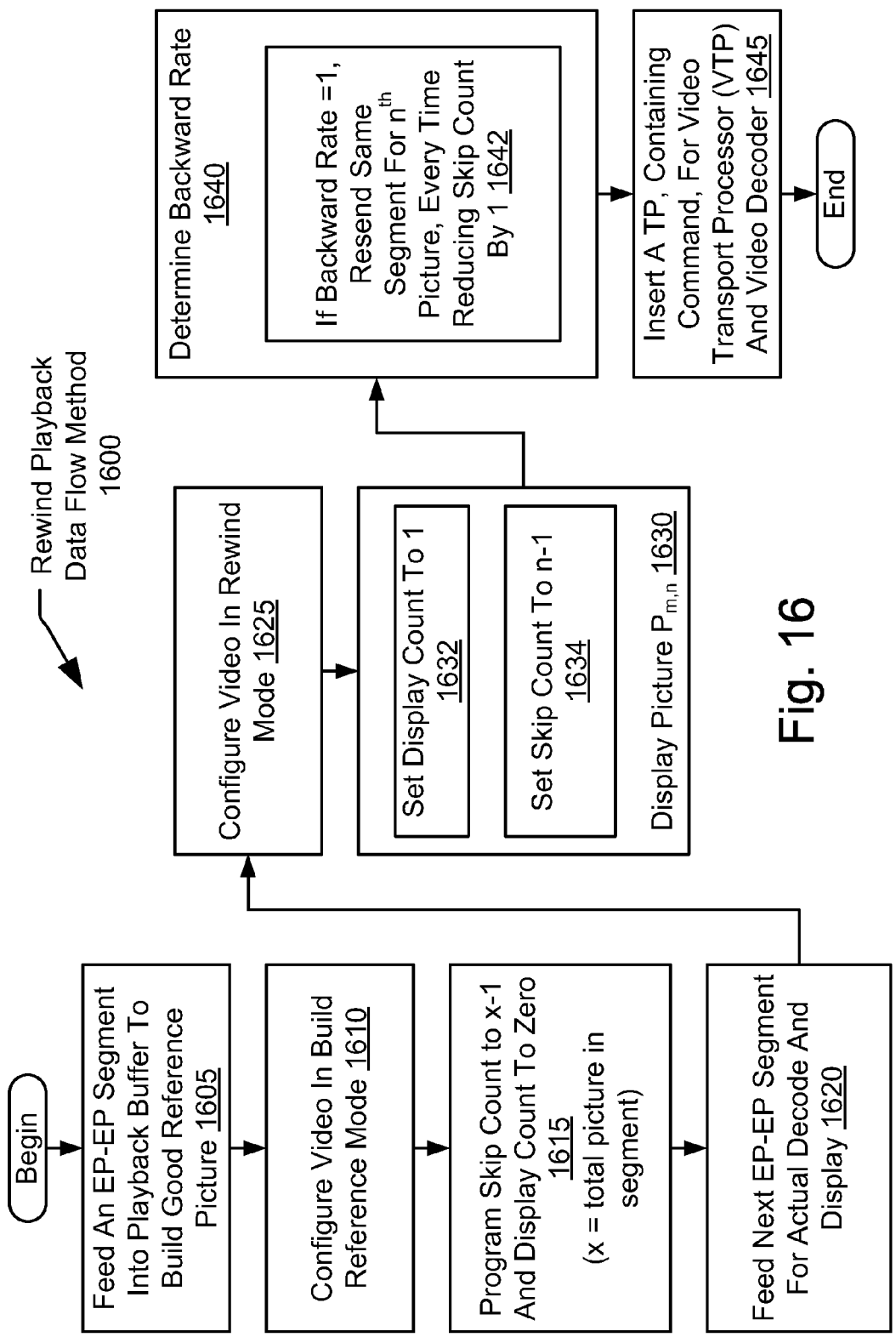
FIG. 16 is a functional block diagram illustrating an embodiment of a rewind playback data flow method that is performed in accordance with certain aspects of the present invention.

FIG. 16 is a functional block diagram illustrating an embodiment of a rewind playback data flow method 1600 that is performed in accordance with certain aspects of the present invention. During rewind, the CPU plays a major role in scheduling the data in the correct order. In order to correctly decode and display a particular frame, it is important that all the pictures before it were indeed created using "good" data. Since PROGRESSIVE REFRESH streams have no I pictures, but are progressively refreshed, the CPU first feeds an EP-EP segment into the Playback Buffers to build a good reference picture as shown in a block 1605. Then, the CPU needs to configure the video in BUILD_REFERENCE mode as shown in a block 1610.

In a block 1615, the SKIP_COUNT needs to be programmed to x−1 and DISPLAY_COUNT needs to be 0, where x is the total number of pictures in the segment. The CPU then feeds the next EP-EP segment, which is to be used for the actual decode and display, as shown in a block 1620. The CPU configures the video in REWIND mode shown in a block 1625. Then, in a block 1630, the picture $P_{m,n}$ is displayed. The DISPLAY_COUNT is set to 1 in a block 1632 and the SKIP_COUNT is set to n−1 in a block 1634 to display the picture $P_{m,n}$.

Then, in a block 1640, the backward rate of the rewind data flow is determined. If the CPU desires to go backwards at a ×1 rate (in a block 1642), then it resends the same segment that it supplied for the $n^{th}$ picture, every time reducing the SKIP_COUNT fields value by one (1). The CPU also inserts a TP/TS formatted command packet (containing the command) for the VIDEO TRANSPORT PROCESSOR and the video decoder.

Figure 17:
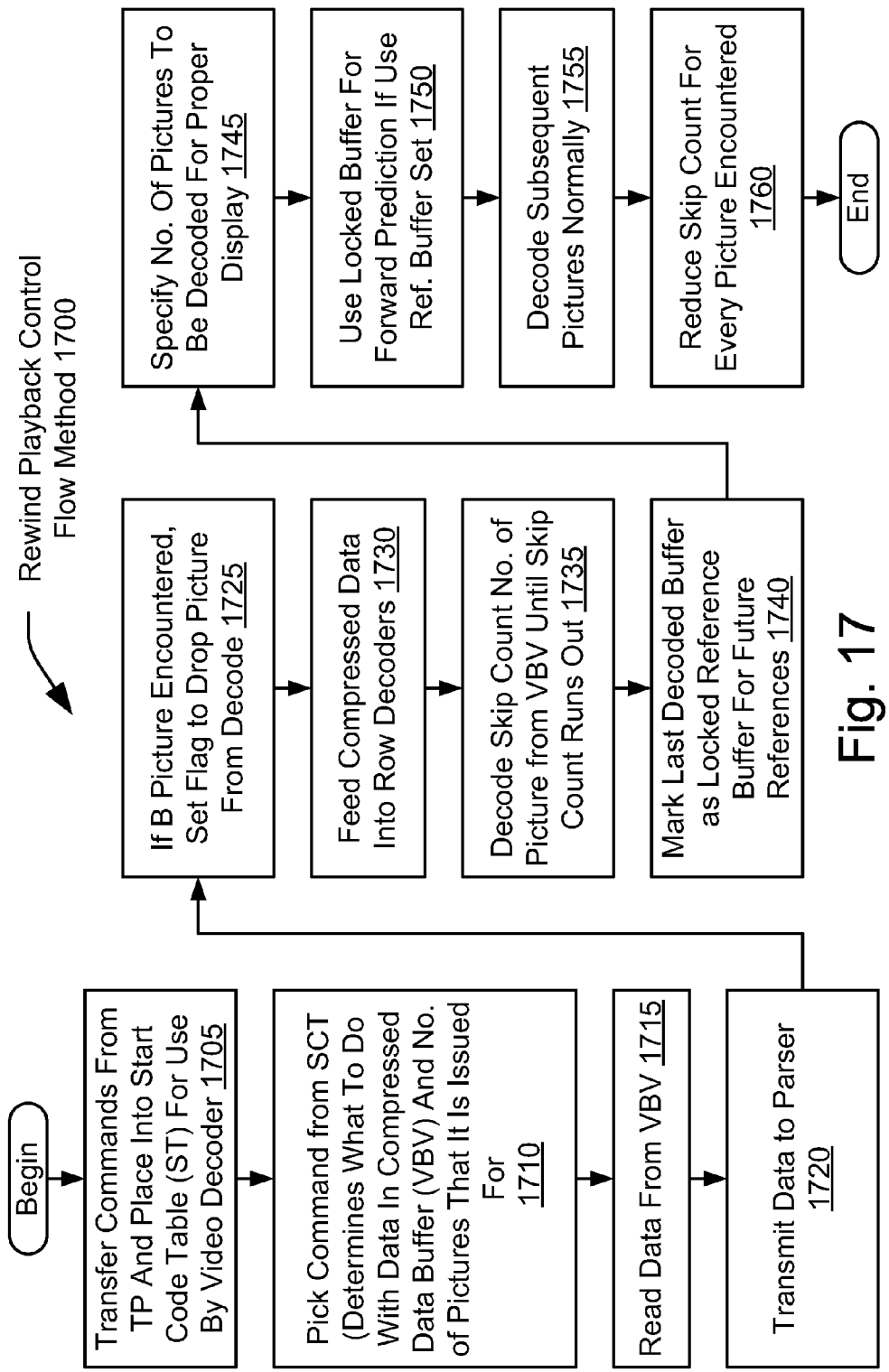
FIG. 17 is a functional block diagram illustrating an embodiment of a rewind/playback control flow method that is performed in accordance with certain aspects of the present invention.

FIG. 17 is a functional block diagram illustrating an embodiment of a rewind playback control flow method that is performed in accordance with certain aspects of the present invention. In a block 1705, the VIDEO TRANSPORT PROCESSOR transfers the commands from the TP/TS formatted command packet and places it in the Start Code Table (SCT) for use by video decoder. Then, in a block 1710, the Video decoder picks the command from the SCT and decides what to do with the data in the compressed data buffer (VBV). The command tells the video decoder that it is Rewind Build (using BUILD_REFERENCE, for example). The command also gives the number of pictures that it has been issued for in the block 1710.

Then, in a block 1715, the VBV Manager is kicked off to read data from the VBV. In a block 1720, the data is fed to a Parser. Since this is a REFERENCE_BUILD, the Buffer manager does not push any picture into the Display Queue. In a block 1725, if a B picture is encountered, the Buffer Manager sets a flag to indicate to the VBV manager to drop that picture from Decode. The VBV manager begins to start feeding the compressed data to the Row Decoders in a block 1730. The buffer manager uses all the three/four buffers in the BUILD_REFERENCE mode.

Then, in a block 1735, the Video decoder decodes the SKIP_COUNT number of pictures from the VBV. Once the SKIP_COUNT runs out, the last buffer that was used for decode is marked as "LockedReferenceBuffer" for future references in a block 1740. This Special lock is over and above the common "locked for decode" that exists in the design today. When the Video Decoder is configured in the REWIND command, the video decoder reads compressed data from the VBV to generate one displayable picture.

Then, in a block 1745, the command specifies the number of pictures that need to be decoded in order to display the desired picture. The Buffer Manager uses the "Locked" buffer as the buffer for Forward Prediction if it finds the 'UseReferenceBuffer' SET in a block 1750. It also clears the Flag so that it does not get used again for that Command session.

In a block 1755, all subsequent pictures are decoded normally, constantly updating the buffers that are used for Forward and Backward predictions. The buffer manager is careful not to overwrite the Locked Reference Buffer. In the Three buffers mode, since one of the buffers is Locked, the other two are used for the decoding of the I/P pictures and the B pictures are discarded. In the four buffer mode, the B pictures that are intended for Display are only decoded.

In a block 1760, the skip count is reduced for every picture that the Buffer Manager encounters. If a B picture is encountered, then the skip count is reduced and a flag is set to indicate the VBV manager to skip that picture. If the skip count becomes zero on a picture, then it is intended that, that picture has to be displayed. In the four buffer scheme, if that picture is a B picture, then we decode and display that picture. However, if we are working in the three buffer mode, then we will not even have a buffer to decode that B picture into as one of the buffers would be the Locked Reference frame and the other two would be carrying the current I/P Forward and Backward prediction reference frames. In such a scenario, the previously decoded picture, (the current Backward prediction buffer) is pushed for display queue.

Below an example is described to illustrate the operation of certain aspects of the present invention that are described above in the various embodiments of the present invention.

For example, if the pictures to be displayed are $P_{m,n}$, $P_{m,n-1}$, $P_{m,n-2}$, $P_{m,n-3}$ and so on, following sequence needs to be followed:

A reference picture is built by feeding the segment between $EP_{m-1}$ to $EP_m$. To achieve this, the CPU needs to configure video in BUILD_REFERENCE command. The DISPLAY_COUNT needs to be programmed to 0 and SKIP_COUNT to x−1, where x is the total number of pictures in the segment.

The CPU then feeds the pictures from $P_{m,0}$ to $P_{m,n}$ in the segment from $EP_m$ to $EP_{m+1}$, which is to be used for the actual decode and display. The CPU has to configure video in the REWIND mode. The DISPLAY_COUNT should be programmed to 1 and SKIP_COUNT to n−1 to display the picture $P_{m,n}$.

Similarly, the CPU again feeds the pictures from $P_{m,0}$ to $P_{m,n-1}$ in the segment from $EP_m$ to $EP_{m+1}$, which is to be used for the actual decode and display time. Again, the CPU needs to configure video in REWIND mode. But, this time, the DISPLAY_COUNT should be programmed to 1 and SKIP_COUNT to n−2 to display the picture display the picture $P_{m,n-1}$. The above process is repeated, decreasing the SKIP_COUNT, till the picture $P_{m,0}$ is displayed.

The decoding of the sequence headers is described below. From the SCIT, the CPU knows the packet that contains the sequence header. The CPU can send only the sequence header data to the video by sending a TP before the packet containing the sequence header. This TP could contain the command that instructs the VIDEO TRANSPORT PROCESSOR to discard the bytes between Transport Header and the PICTURE_START and/or to discard the bytes starting from the start code following the Sequence header till the end of the packet. The DISCARD_HEADEND and the DISCARD_TAILEND field have to be programmed accordingly.

For example, if a packet contains sequence header starts from byte offset 10 and the start code following it (and if this start code is not of interest at this point) starts at byte offset 150, the DISCARD_HEADEND and DISCARD_TAILEND should be programmed to 10 and 150 respectively. As long as the TP that follows next contains valid values, the other fields in this TP can have any value. The video is put in PROCESS mode.

In view of the above detailed description of the invention and associated drawings, other modifications and variations will now become apparent to those skilled in the art. It should also be apparent that such other modifications and variations may be effected without departing from the spirit and scope of the invention.

APPENDIX

MPEG-2 Video in the Progressive-Refresh Mode

In an MPEG-2 coded bit stream, the coded picture following a group of pictures (GOP) header shall be a coded I-picture. However, if there is no GOP header in the bit stream, I-pictures are not mandated in the bit stream. One of "no I-picture" bit streams is called the progressive refresh bit stream by Motorola (DigiCipher II).

When the (DigiCipher II) encoder is configured for progressive refresh, the refresh depth is specified. This depth is ranged from 1 to 9 slices per P-picture to be refreshed. The default value is three slices per P-picture while B-pictures are enabled and one slice per P-picture while B-pictures are disabled. One typical configuration is six slices per P-picture while "two B-picture mode" is enabled. In the progressive refresh mode, both intra_slice_flag and intra_slice are set to "1" for the refreshed intra slices.

When the (DigiCipher II) encoder is configured for progressive refresh, the vertical search range for motion vectors in a P-picture is restricted. The motion vectors for the macroblocks located above the refreshed slices in the current P-picture can only point to the region above the refreshed slices in the previous P-picture (as shown in FIG. 18).

Figure 18:
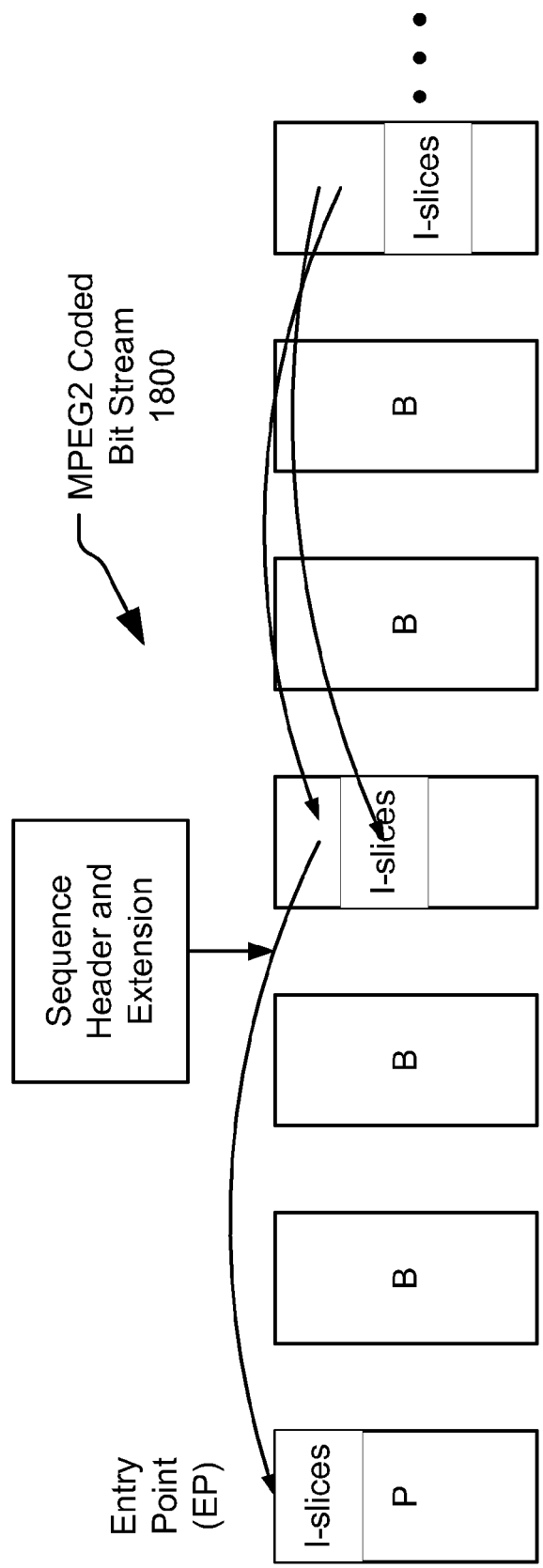
FIG. 18 is a system diagram illustrating an embodiment of an MPEG-2 coded bit stream that is configured in accordance with certain aspects of the present invention.

The sequence header and extensions can be inserted before any P-picture, e.g. before second P-picture shown in FIG. 18. From certain perspectives, the FIG. 18 shows the motion vector search range for the progressive-refresh mode.

What is claimed is:

1. A method for trick play capability in a device with a decoder to decode a transport stream that includes at least one of video data or audio data, the method comprising:
   receiving, by the device, the transport stream via a channel, wherein the received transport stream includes an embedded transport stream formatted command packet;
   calculating an entry point picture within the received transport stream based on a parameter of the transport stream;
   decoding at least a portion of the received transport stream and the embedded transport stream formatted command packet, wherein the decoding the embedded transport stream formatted command packet operates to identify a selected operation to be performed on the at least the portion of the received transport stream, the selected operation includes at least one of playback or trick play, and wherein the decoding the at least the portion of the transport stream further comprises identifying the embedded transport stream formatted command packet within the transport stream; and executing at least a portion of the selected operation on the at least the portion of the received transport stream based upon the entry point picture; and providing for substantially real-time display of the at least one of the video data and the audio data of the at least the portion of the received transport stream based upon the selected operation.

2. The method of claim 1, wherein the trick play comprises at least one of pause/still, fast forward, rewind, slow forward, slow rewind, or skip.

3. The method of claim 1, wherein the parameter comprises at least one of a current location within the transport stream or a plurality of possible entry point pictures within the transport stream.

4. The method of claim 1 further comprising:
identifying the transport stream formatted command packet as a corrupted data packet; and
discarding the corrupted data packet, wherein the transport stream includes a remaining transport stream.

5. A method for command communication to a device of a plurality of devices within a system, the method comprising:
encoding data to produce a transport stream having a plurality of data packets in a transport stream format;
encoding a command in the transport stream format to produce a transport stream formatted command packet, wherein the command includes a trick play operation based on user input or based on transport stream content;
generating the transport stream, wherein the transport stream including the plurality of data packets;
embedding the transport stream formatted command packet in the transport stream, wherein the command packet includes the trick play operation to be performed on at least a portion of the plurality of data packets;
communicating the transport stream including the transport stream formatted command packet from a first device to a second device via a channel, wherein at least one of the first device and the second device comprises a host processor;
decoding at least a portion of the transport stream to extract the data for real-time display and to extract the trick play operation from the embedded transport stream formatted command packet, wherein the decoding the at least the portion of the transport stream further comprises identifying the transport stream formatted command packet within the transport stream; and
providing for substantially real-time display, via display, of the data based upon the trick play operation.

6. The method of claim 5, wherein the decoding the at least the portion of the transport stream further comprises to identify a playback operation to be performed on the at least the portion of the transport stream.

7. The method of claim 6, wherein an MPEG video decoder performs the decoding of the at least the portion of the transport stream.

8. The method of claim 5, wherein transport stream formatted command packet precedes a data packet within the plurality of data packets of the transport stream from which the portion of the data is extracted.

9. The method of claim 5, wherein the transport stream is communicated via the channel including at least one of a digital channel and an analog channel.

10. The method of claim 5, further comprising displaying the portion of the data on the display.

11. The method of claim 5, wherein the encoding the command into the command packet having the transport stream format is performed prior to decoding the transport stream.

12. The method of claim 5, wherein decoding the at least the portion of the transport stream further comprises calculating an entry point picture within the transport stream based on a parameter of the transport stream.

13. A personal video recorder system comprises:
a transport stream source configured to produce a transport stream with a plurality of data packets in a transport stream format; and
a decoder configured to receive the transport stream via a channel and from the transport stream source and to decode at least a portion of the transport stream, wherein when the received transport stream includes a command packet embedded in the transport stream, the decoder is configured to:
calculate an entry point picture within the received transport stream based on a parameter of the received transport stream;
decode the at least the portion of the received transport stream and the embedded transport stream formatted command packet, wherein the decoding of the embedded transport stream formatted command packet operates to identify a selected operation to be performed on the at least the portion of the received transport stream, the selected operation includes at least one of playback or trick play, and wherein the decoding the at least the portion of the transport stream further comprises identifying the embedded transport stream formatted command packet within the transport stream;
execute the selected operation on the at least the portion of the received transport stream based upon the entry point picture; and
provide for substantially real-time display of at least one of the video data or audio data of the at least the portion of the received transport stream based upon the selected operation.

14. The personal video recorder system of claim 13, wherein the transport stream is communicated from a host processor to a display via a channel.

15. The personal video recorder system of claim 13, wherein the trick play comprises at least one of pause/still, fast forward, rewind, slow forward, slow rewind, or skip.

16. The personal video recorder system of claim 13, wherein the transport stream formatted command packet is inserted into the transport stream.

17. The personal video recorder system of claim 13, wherein the transport stream formatted command packet precedes the plurality of data packets of the transport stream.

18. The personal video recorder system of claim 13, wherein the transport stream formatted command packet includes a plurality of fields.

19. The personal video recorder system of claim 18, wherein the plurality of fields include information related to a start picture and an end picture.

20. The personal video recorder system of claim 13, wherein the decoder is further configured to:
identify whether the transport stream formatted command packet is a corrupted data packet; and
discard the corrupted data packet when the transport stream formatted command packet is identified as the corrupted data packet.

* * * * *